US008965177B2

(12) United States Patent
Casagrande

(10) Patent No.: US 8,965,177 B2
(45) Date of Patent: *Feb. 24, 2015

(54) METHODS AND APPARATUS FOR DISPLAYING INTERSTITIAL BREAKS IN A PROGRESS BAR OF A VIDEO STREAM

(75) Inventor: Steven Michael Casagrande, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 579 days.

This patent is subject to a terminal disclaimer.

(21) Appl. No.: 13/294,818

(22) Filed: Nov. 11, 2011

(65) Prior Publication Data

US 2012/0057848 A1 Mar. 8, 2012

Related U.S. Application Data

(63) Continuation of application No. 11/942,901, filed on Nov. 20, 2007, now Pat. No. 8,165,451.

(51) Int. Cl.
*H04N 5/92* (2006.01)
*H04N 5/76* (2006.01)
(Continued)

(52) U.S. Cl.
CPC ............ *H04N 5/76* (2013.01); *H04N 21/4312* (2013.01); *H04N 21/4314* (2013.01); *H04N 21/4325* (2013.01); *H04N 21/44008* (2013.01); *H04N 21/472* (2013.01); *H04N 21/812* (2013.01)
USPC ........................................................ 386/245

(58) Field of Classification Search
CPC .............. H04N 7/0885; H04N 9/8233; H04N 21/8456; H04N 21/4545; H04N 21/4884; H04N 21/435; H04N 21/44008; H04N 21/84

USPC ......................................................... 386/245
See application file for complete search history.

(56) References Cited

U.S. PATENT DOCUMENTS 3,682,363 A 8/1972 Hull
3,919,479 A 11/1975 Moon
(Continued)

FOREIGN PATENT DOCUMENTS

EP 521454 1/1993
EP 594241 4/1994
(Continued)

OTHER PUBLICATIONS

European Patent Office, "European Search Report" mailed Feb. 24, 2012; International Appln. No. 08169362.4-1241/2061239.
(Continued)

*Primary Examiner* — Thai Tran
*Assistant Examiner* — Jose Mesa
(74) *Attorney, Agent, or Firm* — Ingrassia Fisher & Lorenz, P.C.

(57) ABSTRACT

Various embodiments of apparatus and/or methods are described for presenting information regarding interstitials of a video stream. A recording of a television show may include segments of the show interspersed with interstitials (e.g., commercials). The location of the interstitials within the recording is identified, and the locations of the interstitials are presented in progress bar during presentation of the video stream. The location of the interstitials may also be utilized to determine durations of the interstitials, and provide a user with information regarding the lengths of the interstitials of a recording, and/or the length of the other content of a recording (e.g., segments of a television show).

17 Claims, 12 Drawing Sheets

(51) Int. Cl.
  *H04N 21/431* (2011.01)
  *H04N 21/432* (2011.01)
  *H04N 21/44* (2011.01)
  *H04N 21/472* (2011.01)
  *H04N 21/81* (2011.01)

(56) References Cited

U.S. PATENT DOCUMENTS

| | | |
|---|---|---|
| 3,942,190 A | 3/1976 | Detweiler |
| 4,224,481 A | 9/1980 | Russell |
| 4,313,135 A | 1/1982 | Cooper |
| 4,331,974 A | 5/1982 | Cogswell et al. |
| 4,388,659 A | 6/1983 | Lemke |
| 4,404,589 A | 9/1983 | Wright, Jr. |
| 4,408,309 A | 10/1983 | Kiesling et al. |
| 4,439,785 A | 3/1984 | Leonard |
| 4,450,531 A | 5/1984 | Kenyon |
| 4,520,404 A | 5/1985 | Von Kohorn |
| 4,602,297 A | 7/1986 | Reese |
| 4,605,964 A | 8/1986 | Chard |
| 4,633,331 A | 12/1986 | McGrady et al. |
| 4,665,431 A | 5/1987 | Cooper |
| 4,697,209 A | 9/1987 | Kiewit |
| 4,706,121 A | 11/1987 | Young |
| 4,739,398 A | 4/1988 | Thomas |
| 4,750,213 A | 6/1988 | Novak |
| 4,755,889 A | 7/1988 | Schwartz |
| 4,760,442 A | 7/1988 | O'Connell et al. |
| 4,761,694 A | 8/1988 | Shudo et al. |
| 4,789,961 A | 12/1988 | Tindall |
| 4,805,217 A | 2/1989 | Morihiro et al. |
| 4,816,905 A | 3/1989 | Tweedy et al. |
| 4,833,710 A | 5/1989 | Hirashima |
| 4,876,670 A | 10/1989 | Nakabayashi et al. |
| 4,888,769 A | 12/1989 | Deal |
| 4,891,715 A | 1/1990 | Levy |
| 4,897,867 A | 1/1990 | Foster et al. |
| 4,916,682 A | 4/1990 | Tomoda et al. |
| 4,918,730 A | 4/1990 | Schulze |
| 4,920,533 A | 4/1990 | Dufresne et al. |
| 4,930,160 A | 5/1990 | Vogel |
| 4,939,594 A | 7/1990 | Moxon et al. |
| 4,947,244 A | 8/1990 | Fenwick et al. |
| 4,949,169 A | 8/1990 | Lumelsky et al. |
| 4,949,187 A | 8/1990 | Cohen |
| 4,963,866 A | 10/1990 | Duncan |
| 4,963,995 A | 10/1990 | Lang |
| 4,972,190 A | 11/1990 | Primeau et al. |
| 4,974,085 A | 11/1990 | Campbell et al. |
| RE33,535 E | 2/1991 | Cooper |
| 4,991,033 A | 2/1991 | Takeshita |
| 5,014,125 A | 5/1991 | Pocock et al. |
| 5,018,014 A | 5/1991 | Hashimoto |
| 5,057,932 A | 10/1991 | Lang |
| 5,063,453 A | 11/1991 | Yoshimura et al. |
| 5,093,718 A | 3/1992 | Hoarty et al. |
| 5,121,476 A | 6/1992 | Yee |
| 5,126,852 A | 6/1992 | Nishino et al. |
| 5,126,982 A | 6/1992 | Yifrach |
| 5,130,792 A | 7/1992 | Tindell et al. |
| 5,132,992 A | 7/1992 | Yurt et al. |
| 5,134,499 A | 7/1992 | Sata et al. |
| 5,168,353 A | 12/1992 | Walker |
| 5,191,410 A | 3/1993 | McCalley et al. |
| 5,202,761 A | 4/1993 | Cooper |
| 5,227,876 A | 7/1993 | Cucchi et al. |
| 5,233,423 A | 8/1993 | Jernigan et al. |
| 5,241,428 A | 8/1993 | Goldwasser et al. |
| 5,245,430 A | 9/1993 | Nishimura |
| 5,247,347 A | 9/1993 | Litteral et al. |
| 5,253,275 A | 10/1993 | Yurt et al. |
| 5,311,423 A | 5/1994 | Clark |
| 5,329,320 A | 7/1994 | Yifrach |
| 5,333,091 A | 7/1994 | Iggulden |
| 5,357,276 A | 10/1994 | Banker et al. |
| 5,361,261 A | 11/1994 | Edem et al. |
| 5,371,551 A | 12/1994 | Logan et al. |
| 5,412,416 A | 5/1995 | Nemirofsky |
| 5,414,455 A | 5/1995 | Hooper et al. |
| 5,434,678 A | 7/1995 | Abecassis |
| 5,438,423 A | 8/1995 | Lynch |
| 5,440,334 A | 8/1995 | Walters et al. |
| 5,442,390 A | 8/1995 | Hooper et al. |
| 5,442,455 A | 8/1995 | Hioki et al. |
| 5,452,006 A | 9/1995 | Auld |
| 5,453,790 A | 9/1995 | Vermeulen et al. |
| 5,461,415 A | 10/1995 | Wolf et al. |
| 5,461,428 A | 10/1995 | Yoo |
| 5,477,263 A | 12/1995 | O'Callaghan et al. |
| 5,481,542 A | 1/1996 | Logston et al. |
| 5,508,940 A | 4/1996 | Rossmer et al. |
| 5,510,905 A | 4/1996 | Birk |
| 5,513,011 A | 4/1996 | Matsumoto et al. |
| 5,517,250 A | 5/1996 | Hoogenboom et al. |
| 5,521,630 A | 5/1996 | Chen et al. |
| 5,528,282 A | 6/1996 | Voeten et al. |
| 5,533,021 A | 7/1996 | Branstad et al. |
| 5,535,137 A | 7/1996 | Rossmere et al. |
| 5,535,229 A | 7/1996 | Hain, Jr. et al. |
| 5,537,408 A | 7/1996 | Branstad et al. |
| 5,541,919 A | 7/1996 | Young et al. |
| 5,550,594 A | 8/1996 | Cooper et al. |
| 5,553,005 A | 9/1996 | Voeten et al. |
| 5,555,463 A | 9/1996 | Staron et al. |
| 5,555,555 A | 9/1996 | Sato et al. |
| 5,557,538 A | 9/1996 | Reter et al. |
| 5,557,541 A | 9/1996 | Schulhof et al. |
| 5,559,999 A | 9/1996 | Maturi et al. |
| 5,563,714 A | 10/1996 | Inoue et al. |
| 5,572,261 A | 11/1996 | Cooper |
| 5,574,662 A | 11/1996 | Windrem et al. |
| 5,581,479 A | 12/1996 | McLaughlin et al. |
| 5,583,561 A | 12/1996 | Baker et al. |
| 5,583,652 A | 12/1996 | Ware |
| 5,586,264 A | 12/1996 | Belknap et al. |
| 5,600,364 A | 2/1997 | Hendricks et al. |
| 5,603,058 A | 2/1997 | Belknap et al. |
| 5,604,544 A | 2/1997 | Bertram |
| 5,610,653 A | 3/1997 | Abecassis |
| 5,614,940 A | 3/1997 | Cobbley |
| 5,619,335 A | 4/1997 | Tsinberg et al. |
| 5,619,337 A | 4/1997 | Naimpally |
| 5,625,464 A | 4/1997 | Compoint et al. |
| 5,629,732 A | 5/1997 | Moskowitz et al. |
| 5,642,171 A | 6/1997 | Baumgartner et al. |
| 5,648,824 A | 7/1997 | Dunn |
| 5,659,539 A | 8/1997 | Porter et al. |
| 5,664,044 A | 9/1997 | Ware |
| 5,668,948 A | 9/1997 | Belknap et al. |
| 5,675,388 A | 10/1997 | Cooper |
| 5,682,488 A | 10/1997 | Gleason et al. |
| 5,684,918 A | 11/1997 | Abecassis |
| 5,692,093 A | 11/1997 | Iggulden |
| 5,696,866 A | 12/1997 | Iggulden |
| 5,696,868 A | 12/1997 | Kim et al. |
| 5,696,869 A | 12/1997 | Abecassis |
| 5,701,383 A | 12/1997 | Russo et al. |
| 5,703,655 A | 12/1997 | Corey |
| 5,706,388 A | 1/1998 | Isaka |
| 5,712,976 A | 1/1998 | Falcon, Jr. et al. |
| D390,839 S | 2/1998 | Yamamoto et al. |
| 5,715,356 A | 2/1998 | Hirayama et al. |
| 5,719,982 A | 2/1998 | Kawamura et al. |
| 5,721,815 A | 2/1998 | Ottesen et al. |
| 5,721,878 A | 2/1998 | Ottesen et al. |
| D392,269 S | 3/1998 | Mason et al. |
| 5,724,474 A | 3/1998 | Oguro et al. |
| 5,742,730 A | 4/1998 | Couts |
| 5,751,282 A | 5/1998 | Girard et al. |
| 5,751,883 A | 5/1998 | Ottesen et al. |
| 5,761,417 A | 6/1998 | Henley et al. |
| 5,774,170 A | 6/1998 | Hite et al. |
| 5,774,186 A | 6/1998 | Brodsky |
| 5,778,137 A | 7/1998 | Nielsen et al. |

(56) References Cited

U.S. PATENT DOCUMENTS

| | | |
|---|---|---|
| 5,805,763 A | 9/1998 | Lawler et al. |
| 5,805,821 A | 9/1998 | Saxena et al. |
| 5,808,607 A | 9/1998 | Brady et al. |
| 5,815,689 A | 9/1998 | Shaw et al. |
| 5,822,493 A | 10/1998 | Uehara et al. |
| 5,848,217 A | 12/1998 | Tsukagoshi et al. |
| 5,864,682 A | 1/1999 | Porter et al. |
| 5,870,553 A | 2/1999 | Shaw et al. |
| 5,889,915 A | 3/1999 | Hewton |
| 5,892,536 A | 4/1999 | Logan |
| 5,892,884 A | 4/1999 | Sugiyama et al. |
| 5,899,578 A | 5/1999 | Yanagihara et al. |
| 5,920,572 A | 7/1999 | Washington et al. |
| 5,930,444 A | 7/1999 | Camhi et al. |
| 5,930,493 A | 7/1999 | Ottesen et al. |
| 5,949,954 A | 9/1999 | Young et al. |
| 5,953,485 A | 9/1999 | Abecassis |
| 5,956,716 A | 9/1999 | Kenner et al. |
| 5,973,679 A | 10/1999 | Abbott et al. |
| 5,987,210 A | 11/1999 | Iggulden |
| 5,995,709 A | 11/1999 | Tsuge |
| 5,999,688 A | 12/1999 | Iggulden |
| 5,999,691 A | 12/1999 | Takagi et al. |
| 6,002,832 A | 12/1999 | Yoneda |
| 6,005,562 A | 12/1999 | Shiga et al. |
| 6,005,564 A | 12/1999 | Ahmad et al. |
| 6,005,603 A | 12/1999 | Flavin |
| 6,011,594 A | 1/2000 | Takashima |
| 6,018,612 A | 1/2000 | Thomason et al. |
| 6,028,599 A | 2/2000 | Yuen et al. |
| 6,055,495 A | 4/2000 | Tucker et al. |
| D424,543 S | 5/2000 | Hodgson |
| 6,057,893 A | 5/2000 | Kojima et al. |
| D426,208 S | 6/2000 | Hodgson |
| D426,209 S | 6/2000 | Hodgson |
| 6,088,455 A | 7/2000 | Logan |
| 6,091,886 A | 7/2000 | Abecassis |
| RE36,801 E | 8/2000 | Logan et al. |
| 6,100,941 A | 8/2000 | Dimitrova et al. |
| 6,112,226 A | 8/2000 | Weaver et al. |
| 6,138,147 A | 10/2000 | Weaver et al. |
| 6,151,444 A | 11/2000 | Abecassis |
| 6,163,644 A | 12/2000 | Owashi et al. |
| 6,167,083 A | 12/2000 | Sporer et al. |
| 6,169,843 B1 | 1/2001 | Lenihan et al. |
| 6,192,189 B1 | 2/2001 | Fujinami et al. |
| 6,198,877 B1 | 3/2001 | Kawamura et al. |
| 6,208,804 B1 | 3/2001 | Ottesen et al. |
| 6,208,805 B1 | 3/2001 | Abecassis |
| 6,226,447 B1 | 5/2001 | Sasaki et al. |
| 6,232,926 B1 | 5/2001 | Nguyen et al. |
| 6,233,389 B1 | 5/2001 | Barton |
| 6,243,676 B1 | 6/2001 | Witteman |
| 6,278,837 B1 | 8/2001 | Yasukohchi et al. |
| 6,285,824 B1 | 9/2001 | Yanagihara et al. |
| 6,304,714 B1 | 10/2001 | Krause et al. |
| 6,330,675 B1 | 12/2001 | Wiser et al. |
| 6,335,730 B1 | 1/2002 | Gould |
| 6,341,195 B1 | 1/2002 | Mankovitz et al. |
| D454,574 S | 3/2002 | Wasko et al. |
| 6,400,407 B1 | 6/2002 | Zigmond et al. |
| 6,408,128 B1 | 6/2002 | Abecassis |
| 6,424,791 B1 | 7/2002 | Saib |
| 6,425,127 B1 | 7/2002 | Bates et al. |
| 6,445,738 B1 | 9/2002 | Zdepski et al. |
| 6,445,872 B1 | 9/2002 | Sano et al. |
| 6,452,615 B1 | 9/2002 | Chiu et al. |
| 6,490,000 B1 | 12/2002 | Schaefer et al. |
| 6,498,894 B2 | 12/2002 | Ito et al. |
| 6,504,990 B1 | 1/2003 | Abecassis |
| D470,153 S | 2/2003 | Billmaier et al. |
| 6,529,685 B2 | 3/2003 | Ottesen et al. |
| 6,542,695 B1 | 4/2003 | Akiba et al. |
| 6,553,178 B2 | 4/2003 | Abecassis |
| 6,574,594 B2 | 6/2003 | Pitman |
| 6,677,967 B2 | 1/2004 | Sawano et al. |
| 6,698,020 B1 | 2/2004 | Zigmond |
| 6,701,355 B1 | 3/2004 | Brandt et al. |
| 6,718,551 B1 | 4/2004 | Swix |
| 6,760,017 B1 | 7/2004 | Banerjee et al. |
| 6,788,882 B1 | 9/2004 | Geer et al. |
| D499,740 S | 12/2004 | Ombao et al. |
| 6,850,691 B1 | 2/2005 | Stam et al. |
| 6,871,006 B1 | 3/2005 | Oguz et al. |
| 6,931,451 B1 | 8/2005 | Logan |
| 6,978,470 B2 | 12/2005 | Swix |
| 7,032,177 B2 | 4/2006 | Novak |
| 7,032,179 B2 | 4/2006 | Mack et al. |
| D521,521 S | 5/2006 | Jewitt et al. |
| 7,055,166 B1 | 5/2006 | Logan |
| 7,058,376 B2 | 6/2006 | Logan |
| 7,072,849 B1 | 7/2006 | Filepp et al. |
| 7,110,658 B1 | 9/2006 | Iggulden |
| 7,187,884 B2 | 3/2007 | Bardolatzy et al. |
| 7,197,758 B1 | 3/2007 | Blackketter et al. |
| D539,809 S | 4/2007 | Totten et al. |
| 7,243,362 B2 | 7/2007 | Swix |
| 7,251,413 B2 | 7/2007 | Dow |
| 7,266,832 B2 | 9/2007 | Miller |
| 7,272,298 B1 | 9/2007 | Lang et al. |
| D554,140 S | 10/2007 | Armendariz |
| D558,220 S | 12/2007 | Maitlen et al. |
| 7,319,761 B2 | 1/2008 | Bianchi et al. |
| 7,320,137 B1 | 1/2008 | Novak |
| 7,376,469 B2 | 5/2008 | Eischeid et al. |
| 7,430,360 B2 | 9/2008 | Abecassis |
| D596,646 S | 7/2009 | Wani |
| D604,308 S | 11/2009 | Takano |
| 7,631,331 B2 | 12/2009 | Sie |
| 7,634,785 B2 | 12/2009 | Smith |
| 7,661,121 B2 | 2/2010 | Smith |
| 7,801,910 B2 | 9/2010 | Houh et al. |
| 7,889,964 B1 | 2/2011 | Barton et al. |
| 8,606,085 B2 | 12/2013 | Gratton |
| 2002/0069218 A1 | 6/2002 | Sull et al. |
| 2002/0088010 A1 | 7/2002 | Dudkiewicz et al. |
| 2002/0090198 A1 | 7/2002 | Rosenberg |
| 2002/0092017 A1 | 7/2002 | Klosterman |
| 2002/0092022 A1 | 7/2002 | Dudikicwicz |
| 2002/0097235 A1 | 7/2002 | Rosenberg |
| 2002/0120925 A1 | 8/2002 | Logan |
| 2002/0124249 A1 | 9/2002 | Shintani et al. |
| 2002/0131511 A1 | 9/2002 | Zenoni |
| 2002/0169540 A1 | 11/2002 | Engstrom |
| 2002/0184047 A1 | 12/2002 | Plotnick |
| 2003/0005052 A1 | 1/2003 | Feuer |
| 2003/0031455 A1 | 2/2003 | Sagar |
| 2003/0031458 A1 | 2/2003 | Takahashi |
| 2003/0066078 A1 | 4/2003 | Bjorgan |
| 2003/0084451 A1 | 5/2003 | Pierzga |
| 2003/0093790 A1 | 5/2003 | Logan |
| 2003/0121037 A1 | 6/2003 | Swix et al. |
| 2003/0154128 A1 | 8/2003 | Liga |
| 2003/0192060 A1 | 10/2003 | Levy |
| 2003/0194213 A1 | 10/2003 | Schultz et al. |
| 2003/0202773 A1 | 10/2003 | Dow |
| 2003/0231854 A1 | 12/2003 | Derrenberger |
| 2004/0010807 A1 | 1/2004 | Urdang |
| 2004/0040042 A1 | 2/2004 | Feinleib |
| 2004/0049780 A1 | 3/2004 | Gee |
| 2004/0083484 A1 | 4/2004 | Ryal |
| 2004/0172650 A1 | 9/2004 | Hawkins et al. |
| 2004/0177317 A1 | 9/2004 | Bradstreet |
| 2004/0189873 A1 | 9/2004 | Konig |
| 2004/0190853 A1 | 9/2004 | Dow |
| 2004/0226035 A1 | 11/2004 | Hauser, Jr. |
| 2004/0244035 A1 | 12/2004 | Wright et al. |
| 2004/0255330 A1 | 12/2004 | Logan |
| 2004/0255334 A1 | 12/2004 | Logan |
| 2004/0255336 A1 | 12/2004 | Logan |
| 2005/0005308 A1 | 1/2005 | Logan |
| 2005/0020223 A1 | 1/2005 | Ellis et al. |
| 2005/0025469 A1 | 2/2005 | Geer et al. |
| 2005/0044561 A1 | 2/2005 | McDonald |

(56) References Cited

U.S. PATENT DOCUMENTS

| | | |
|---|---|---|
| 2005/0076359 A1 | 4/2005 | Pierson et al. |
| 2005/0081252 A1 | 4/2005 | Chefalas |
| 2005/0114214 A1 | 5/2005 | Itoh |
| 2005/0132418 A1 | 6/2005 | Barton et al. |
| 2005/0262539 A1 | 11/2005 | Barton |
| 2006/0013555 A1 | 1/2006 | Poslinski |
| 2006/0015925 A1 | 1/2006 | Logan |
| 2006/0059426 A1 | 3/2006 | Ogikubo |
| 2006/0115058 A1 | 6/2006 | Alexander et al. |
| 2006/0143567 A1 | 6/2006 | Chiu et al. |
| 2006/0168630 A1 | 7/2006 | Davies |
| 2006/0218617 A1 | 9/2006 | Bradstreet |
| 2006/0277564 A1 | 12/2006 | Jarman |
| 2006/0277569 A1 | 12/2006 | Smith |
| 2006/0280437 A1 | 12/2006 | Logan |
| 2006/0288374 A1 | 12/2006 | Ferris |
| 2006/0288392 A1 | 12/2006 | Fleming |
| 2007/0050827 A1 | 3/2007 | Gibbon |
| 2007/0101394 A1 | 5/2007 | Fu et al. |
| 2007/0113250 A1 | 5/2007 | Logan |
| 2007/0118873 A1* | 5/2007 | Houh et al. ............ 725/136 |
| 2007/0124758 A1 | 5/2007 | Sung |
| 2007/0136742 A1 | 6/2007 | Sparrell |
| 2007/0156739 A1 | 7/2007 | Black |
| 2007/0168543 A1 | 7/2007 | Krikorian |
| 2007/0199013 A1 | 8/2007 | Samari et al. |
| 2007/0204288 A1 | 8/2007 | Candelore |
| 2007/0212030 A1 | 9/2007 | Koga et al. |
| 2007/0214473 A1 | 9/2007 | Barton |
| 2007/0276926 A1 | 11/2007 | LaJoie |
| 2007/0300249 A1* | 12/2007 | Smith et al. ............ 725/19 |
| 2007/0300250 A1 | 12/2007 | Smith et al. |
| 2007/0300258 A1 | 12/2007 | O'Connor |
| 2008/0013927 A1 | 1/2008 | Kelly et al. |
| 2008/0036917 A1 | 2/2008 | Pascarella |
| 2008/0052739 A1 | 2/2008 | Logan |
| 2008/0059997 A1 | 3/2008 | Plotnick et al. |
| 2008/0092168 A1* | 4/2008 | Logan et al. ............ 725/44 |
| 2008/0112690 A1 | 5/2008 | Shahraray et al. |
| 2008/0155627 A1 | 6/2008 | O'Connor |
| 2008/0183587 A1 | 7/2008 | Joo et al. |
| 2008/0196060 A1 | 8/2008 | Varghese |
| 2008/0250450 A1 | 10/2008 | Larner et al. |
| 2008/0267584 A1 | 10/2008 | Green |
| 2008/0276266 A1 | 11/2008 | Huchital et al. |
| 2009/0093278 A1 | 4/2009 | Negron et al. |
| 2009/0129747 A1 | 5/2009 | Casagrande |
| 2009/0133092 A1 | 5/2009 | Casagrande |
| 2009/0133093 A1 | 5/2009 | Hodge |
| 2009/0238536 A1 | 9/2009 | Gratton |
| 2009/0271826 A1 | 10/2009 | Lee et al. |
| 2009/0299843 A1 | 12/2009 | Shkedi |
| 2009/0300699 A1 | 12/2009 | Casagrande et al. |
| 2009/0304358 A1 | 12/2009 | Rashkovskiy |
| 2009/0307741 A1 | 12/2009 | Casagrande et al. |
| 2010/0031162 A1 | 2/2010 | Wiser et al. |
| 2010/0053452 A1 | 3/2010 | Abe et al. |
| 2010/0138761 A1 | 6/2010 | Barnes |
| 2010/0158484 A1 | 6/2010 | Casagrande et al. |
| 2010/0162291 A1 | 6/2010 | Casagrande et al. |
| 2010/0162344 A1 | 6/2010 | Casagrande et al. |
| 2010/0274628 A1 | 10/2010 | Kunz et al. |
| 2010/0322592 A1 | 12/2010 | Casagrande |
| 2011/0194838 A1 | 8/2011 | Meijer |
| 2011/0197224 A1 | 8/2011 | Meijer |
| 2011/0200300 A1 | 8/2011 | Barton et al. |

FOREIGN PATENT DOCUMENTS

| | | |
|---|---|---|
| EP | 785675 | 7/1997 |
| EP | 2061239 A2 | 5/2009 |
| GB | 2320637 | 6/1998 |
| JP | 06-233234 | 8/1994 |
| JP | 06-245157 | 9/1994 |
| JP | 07-111629 | 4/1995 |
| JP | 07-131754 | 5/1995 |
| JP | 07-250305 | 9/1995 |
| JP | 07-264529 | 10/1995 |
| JP | 2001 359079 | 12/2001 |
| JP | 2003153114 | 5/2003 |
| JP | 2006 262057 | 9/2006 |
| JP | 2008131150 A | 6/2008 |
| WO | WO 92/22983 | 12/1992 |
| WO | WO 95/32584 | 11/1995 |
| WO | 0223903 | 3/2002 |

OTHER PUBLICATIONS

Canadian Intellectual Property Office, "Office Action" mailed Feb. 27, 2012; Canadian Appln. No. 2,665,850.

USPTO "Non-Final Office Action" mailed Oct. 16, 2012 for U.S. Appl. No. 12/486,641, filed Jun. 17, 2009.

China State Intellectual Property Office "Office Action" mailed Sep. 24, 2012 for China Appln. No. 200980109447.X.

Pogue, David "Networks Start to Offer TV on the Web" The New York Times, Oct. 18, 2007; retrieved from the internet at http://www.nytimes.com/007/10/18/technology/circuits/18pogue.html?pagewanted=print on Aug. 1, 2012.

TIVO "TIVO Launches Remote Scheduling With Verizon Wireless," Mar. 14, 2007.

Associated Press "AT&T Lets Mobile Phones Control Your Television," Mar. 6, 2007.

Canadian Intellectual Property Office "Office Action" dated Dec. 5, 2012 for Canadian Patent Appln. No. 2,665,855.

USPTO "Final Office Action" mailed Oct. 17, 2012 for U.S. Appl. No. 12/703,049, filed Dec. 9, 2010.

USPTO "Final Office Action" mailed Jan. 24, 2013 for U.S. Appl. No. 12/486,641, filed Jun. 17, 2009.

USPTO "Notice of Allowance" mailed Jan. 18, 2013 for U.S. Appl. No. 12/434,742, filed May 4, 2009.

USPTO "Final Office Action" mailed May 10, 2012; U.S. Appl. No. 12/486,641, filed Jun. 17, 2009.

Australian Patent Office "Patent Examination Report No. 2" mailed Jul. 12, 2012 for AU Patent Appln. 2009225834.

USPTO "Final Office Action" mailed Aug. 1, 2012 for U.S. Appl. No. 12/434,751, filed May 4, 2009.

USPTO "Final Office Action" mailed Jul. 19, 2012 for U.S. Appl. No. 12/434,742, filed May 4, 2009.

Dimitrova, N., et al, "Real Time Commercial Detection Using MPEG Features", . Philips Research.

"Paramount Pictures Corp. v. ReplayTV & SonicBlue", http://www.eff.org/IP/Video/Paramount v. ReplayTV/20011031_complaint.html, Complaint Filed, (Oct. 30, 2001).

Manjoo, Farhad, "They Know What You're Watching", Wired News, http://www.wired.com/news/politics/0.1283.52302.00.html, (May 2, 2002).

Haughey, Matt, "EFF's ReplayTV Suit Ends", http://www.pvrblog.com/pvr/2004/01/effs_replaytv_s.html, (Jan. 12, 2004).

Mizutani, Masami, et al, "Commercial Detection in Heterogeneous Video Streams Using Fused Multi-Modal and Temporal Features", IEEE ICASSP, 2005, Philadelphia, (Mar. 22, 2005).

Tew, Chris, "How MythTV Detects Commercials", http://www.pvrwire.com/2006/10/27/how-mythtv-detects-commercials/, (Oct. 27, 2006).

RCA, "RCA DRC8060N DVD Recorder", http://www.pricegrabber.com/rating_getprodrev.php/product_id=12462074/id, PriceGrabber.com, (Jan. 26, 2007).

"How to Write a New Method of Commercial Detection", MythTV, http://www.mythtv.org/wiki/index.php/How to Write a New Method of Commercial Detection, (Jan. 26, 2007).

"Comskip", http://www.kaashoek.com/comskip/, commercial detector, (Jan. 26, 2007).

OA mailed on May 24, 2010 for U.S. Appl. No. 11/942,896, filed Nov. 20, 2007 in the name of Hodge.

ISR for PCT/US2009/037183 mailed on Jul. 15, 2009.

Casagrande "Office Action Response" filed Sep. 2, 2011 for U.S. Appl. No. 11/942,111.

(56) References Cited

OTHER PUBLICATIONS

Casagrande "Office Action Response" filed on Sep. 7, 2011 for U.S. Appl. No. 11/942,901.
USPTO "Notice of Allowance" mailed on Sep. 27, 2011 for U.S. Appl. No. 11/942,901 in the name of Casagrande.
USPTO "Notice of Allowance" mailed on Oct. 14, 2011 for U.S. Appl. No. 11/942,111 in the name of Casagrande.
China State Intellectual Property Office "First Office Action" mailed on Oct. 28, 2011 for Chinese Application No. 200980109447.X.
Canadian Intellectual Property Office "Office Action" mailed on Jun. 27, 2011 for Canadian Application 2,665,855.
USPTO "Non-Final Office Action" mailed Jan. 30, 2012 for U.S. Appl. No. 12/486,641 in the name of Casagrande.
USPTO "Notice of Allowance" mailed Dec. 5, 2011 for U.S. Appl. No. 12/130,792 in the name of Casagrande.
USPTO "Non-Final Office Action" mailed Feb. 7, 2012 for U.S. Appl. No. 12/434,742 in the name of Casagrande.
USPTO "Non-Final Office Action" mailed Feb. 13, 2012 for U.S. Appl. No. 12/434,746 in the name of Casagrande.
USPTO "Non-Final Office Action" mailed Feb. 16, 2012 for U.S. Appl. No. 12/434,751 in the name of Casagrande.
USPTO "Notice of Allowance" mailed Jan. 27, 2012 for U.S. Appl. No. 11/942,896 in the name of Hodge.
Australian Patent Office "Office Action" mailed on Jun. 9, 2011 for Australian Application No. 2009225834.
Canadian Intellectual Property Office "Office Action" mailed on Aug. 31, 2011 for Canadian Application 2,717,933.
Casagrande "Office Action Response" filed Aug. 15, 2011 for U.S. Appl. No. 12/130,792.
USPTO "Advisory Action" mailed Jul. 1, 2011 for U.S. Appl. No. 12/130,792 in the name of Casagrande.
Casagrande "Office Action Response" filed Aug. 15, 2011 for U.S. Appl. No. 12/135,360.
Casagrande "Office Action Response" filed Jun. 13, 2011 for U.S. Appl. No. 12/130,792.
USPTO "Non-Final Office Action" mailed Oct. 3, 2011 for U.S. Appl. No. 11/942,896 in the name of Hodge.
USPTO "Final Office Action" mailed Apr. 14, 2011 for U.S. Appl. No. 12/130,792 in the name of Casagrande.
USPTO "Final Office Action" mailed Apr. 27, 2011 for U.S. Appl. No. 12/135,360 in the name of Casagrande.
USPTO "Non-Final Office Action" mailed Jun. 2, 2011 for U.S. Appl. No. 11/942,111 in the name of Casagrande.
Satterwhite Brandon et al. "Automatic Detection of TV Commercials" IEEE Potentials, Apr./May 2004.
USPTO "Non-Final Office Action" mailed Jun. 7, 2011 for U.S. Appl. No. 11/942,901 in the name of Casagrande.
European Patent Office "Inviatation to Pay Additional Fees and Partial Search Report" mailed May 16, 2011 for International Appln. PCT/EP2011/051335 filed Jan. 31, 2011.
USPTO "Final Office Action" mailed Jan. 31, 2012 for U.S. Appl. No. 12/052,623 in the name of Gratton.
European Patent Office "International Search Report" mailed Oct. 1, 2010; International Appln. No. PCT/US2010/038836, filed Jun. 16, 2010.
European Patent Office "Invitation to Pay Fees and Partial Search Report" for PCT/EP2011/051335 mailed May 16, 2011.
USPTO "Non-Final Office Action" dated Feb. 20, 2014 for U.S. Appl. No. 12/702,750.
Japan Patent Office "Notice of Rejection Ground" mailed Sep. 4, 2012 for Japanese Patent Appln. No. 2011-500879.
Canadian Patent Office "Office Action" mailed Jul. 23, 2012 for Canadian Patent Appln. No. 2,717,933.
USPTO "Non-Final Office Action" mailed Sep. 6, 2012 for U.S. Appl. No. 12/135,360, filed Jun. 9, 2008.
USPTO "Non-Final Office Action" mailed Sep. 25, 2012 for U.S. Appl. No. 12/052,623, filed Mar. 20, 2008.
USPTO "Notice of Allowance" dated Aug. 12, 2013 for U.S. Appl. No. 12/052,623.
European Patent Office "Examination Report" dated Aug. 16, 2013 for European Patent Application No. 09801627.2.
European Patent Office "Examination Report" dated Aug. 16, 2013 for European Patent Application No. 11152790.9.
European Patent Office "Examination Report" dated Aug. 21, 2013 for European Patent Application No. 10 732 771.0.
USPTO "Office Action" dated Sep. 4, 2013 for U.S. Appl. No. 13/407,955.
USPTO "Notice of Allowance" dated Sep. 13, 2013 for U.S. Appl. No. 12/434,746.
USPTO "Notice of Allowance" dated Feb. 1, 2013 for U.S. Appl. No. 12/434,751.
China State Intellectual Property Office "Office Action" dated Feb. 4, 2013 for Chinese Patent Appln. No. 200980109447.X.
USPTO "Final Office Action" dated Feb. 4, 2013 for U.S. Appl. No. 12/434,746.
USPTO "Final Office Action" dated Mar. 15, 2013 for U.S. Appl. No. 12/052,623.
USPTO "Notice of Allowance" dated Mar. 26, 2013 for U.S. Appl. No. 12/486,641.
USPTO "Final Office Action" dated Mar. 28, 2013 for U.S. Appl. No. 12/135,360.
Intellectual Property Corporation of Malaysia, "Substantive Examination Adverse Report" dated May 15, 2014 for Malaysia Patent Application No. PI 2010004195.
USPTO, "Non-Final Office Action" dated Apr. 2, 2012 for U.S. Appl. No. 12/703,049.
USPTO, "Non-Final Office Action" dated Apr. 23, 2014 for U.S. Appl. No. 12/703,049.
USPTO, "Non-Final Office Action" dated May 22, 2014 for U.S. Appl. No. 13/294,800.

* cited by examiner

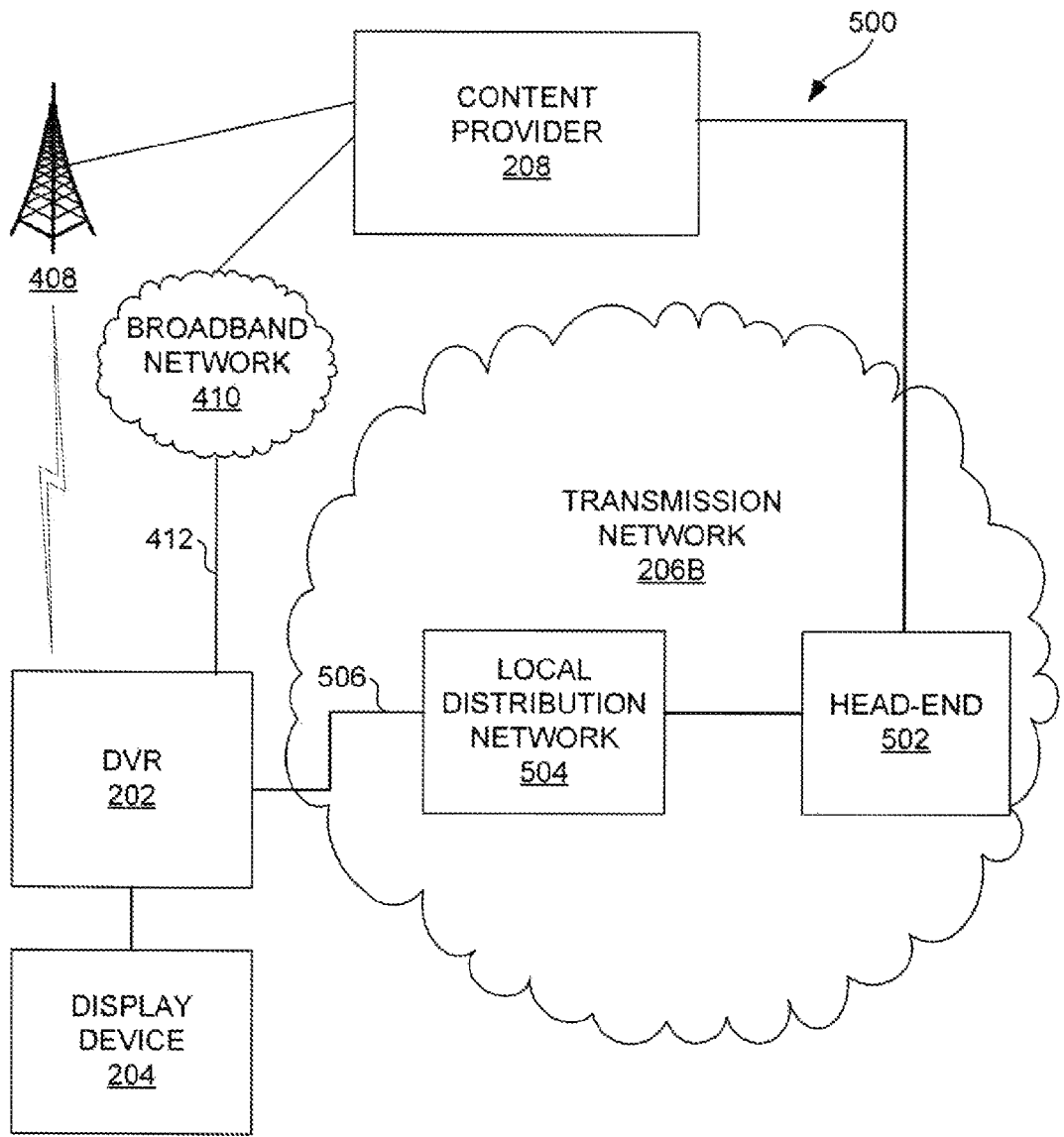
FIG. 5

```
<DishAnnouncement>
    <action>add</action>
    <uid>cz20070226203947</uid>
    <startTime>20070227040000</startTime>
    <endTime>20070227130000</endTime>
    <Package>
        <name>Show Metadata for 'Seinfeld</name>
        <type>0x08</type>       <!-- Show Metadata -->
        <expirationTime>20070227210000</expirationTime>
        <descriptor>
        <!-- program_unique_id_descriptor( ) (syntax 2) -->
        </descriptor>
        <descriptor>
        <!-- segment_descriptor( ) -->
            <tag>0xC1</tag>
            <u8>1</u8>                          <!-- segment_number (1 of 3) -->
            <u8>3</u8>                          <!-- last_segment_number (3) -->
            <u8>20</u8>                         <!-- closed caption string length -->
            <u8>cc_char</u8>                    <!-- close captioning anchor string -->
            ...
            <u8></u8>                           <!-- an even number of <u8>'s -->
            <u32>300300</u32>                   <!-- start_offset -->
            <u32>37800000</u32>                 <!-- end_offset -->
        </descriptor>
        <descriptor>
        <!-- segment_descriptor( ) -->
            <tag>0xC1</tag>
            <u8>2</u8>                          <!-- segment_number (2 of 3) -->
            <u8>3</u8>                          <!-- last_segment_number (3) -->
            <u8>12</u8>                         <!-- closed caption string length -->
            ...
            <u8>cc_char</u8>                    <!-- an even number of <u8>'s -->
            <u32>325225</u32>                   <!-- start_offset -->
            <u32>50400000</u32>                 <!-- end_offset -->
        </descriptor>
        <descriptor>
        <!-- segment_descriptor( ) -->
            <tag>0xC1</tag>
            <u8>3</u8>                          <!-- segment_number (3 of 3) -->
            <u8>3</u8>                          <!-- last_segment_number (3) -->
            <u8>2</u8>                          <!-- closed caption string length -->
            ...
            <u8>cc_char</u8>                    <!-- an even number of <u8>'s -->
            <u32>900000</u32>                   <!-- start_offset -->
            <u32>36070000</u32>                 <!-- end_offset -->
        </descriptor>
    </Package>
</DishAnnouncement>
```

METHODS AND APPARATUS FOR DISPLAYING INTERSTITIAL BREAKS IN A PROGRESS BAR OF A VIDEO STREAM

RELATED APPLICATIONS

This application claims the benefit of U.S. application Ser. No. 11/942,901, entitled "METHODS AND APPARATUS FOR DISPLAYING INFORMATION REGARDING INTERSTITIALS OF A VIDEO STREAM", filed on Nov. 20, 2007, which is hereby incorporated by reference in its entirety.

BACKGROUND

Digital video recorders (DVRs) and personal video recorders (PVRs) allow viewers to record video in a digital format to a disk drive or other type of storage medium for later playback. DVRs are often incorporated into set-top boxes for satellite and cable television services. A television program stored on a set-top box allows a viewer to perform time shifting functions, and may additionally allow a viewer to skip over commercial breaks and other portions of the recording that the viewer does not desire to watch. However, the user performs this function manually, for example, using a fast forward button of a remote control associated with the DVR. This manual fast forwarding is an inconvenience for the user. Further, manual fast forwarding by a user often leads to inaccurate results, because the user may fast forward past portions of the recording they desire to watch, or may resume playback during the portion of the recording that they want to skip over. Additionally, when users are watching recorded television programs and other video content, they are unaware of the location and duration of commercial breaks and other content of which the user may not desire to watch. This makes it difficult and inconvenient for users to skip over the content they do not desire to view, or for the user to step away from the television momentarily (e.g., during a commercial break) without potentially missing content that they want to view (e.g., segments of the show).

BRIEF DESCRIPTION OF THE DRAWINGS

The same number represents the same element or same type of element in all drawings.

FIG. 5 illustrates an embodiment of a cable television distribution system.

FIG. 9 illustrates an example of a metadata stream transmitted to a DVR.

DETAILED DESCRIPTION

The various embodiments described herein generally provide apparatus, systems and methods which facilitate the reception, processing, and outputting of audio/video (A/V) content. In short, various embodiments described herein provide apparatus, system and/or methods for filtering content from an A/V stream based on data included in the A/V stream or associated with the A/V stream.

In at least one embodiment, the A/V stream to be received, processed, outputted and/or communicated may come in any form of a video stream. An A/V stream will also be referred to herein as a video stream. However, it is to be appreciated that a video stream may include an associated audio component. It is to be appreciated that the video stream may be supplied by any source, such as an over-the-air broadcast, a satellite or cable television distribution system, a digital video disk (DVD) or other optical disk, the interne or other communication networks, and the like. In at least one embodiment, the video stream may include text data, such as closed captioning data or subtitles, that is included in the video stream or associated with the video stream. Thus, in at least one embodiment, the video stream may comprise video data, audio data and text data.

In various embodiments described herein, the text data corresponding with a video stream is processed to identify portions of the video stream. In at least one embodiment, the boundaries of the identified portions of the video stream may be indexed for utilization during presentation of the video stream. The portions of the video stream between indexed boundaries may then be designated for presentation to a user, or may be designated for skipping during presentation of the video stream. Thus, in at least one embodiment, portions of a video stream that a user desires to view may be presented to the user, and portions of the video stream that a user desires not to view may be skipped during presentation of the video stream.

Figure 1:
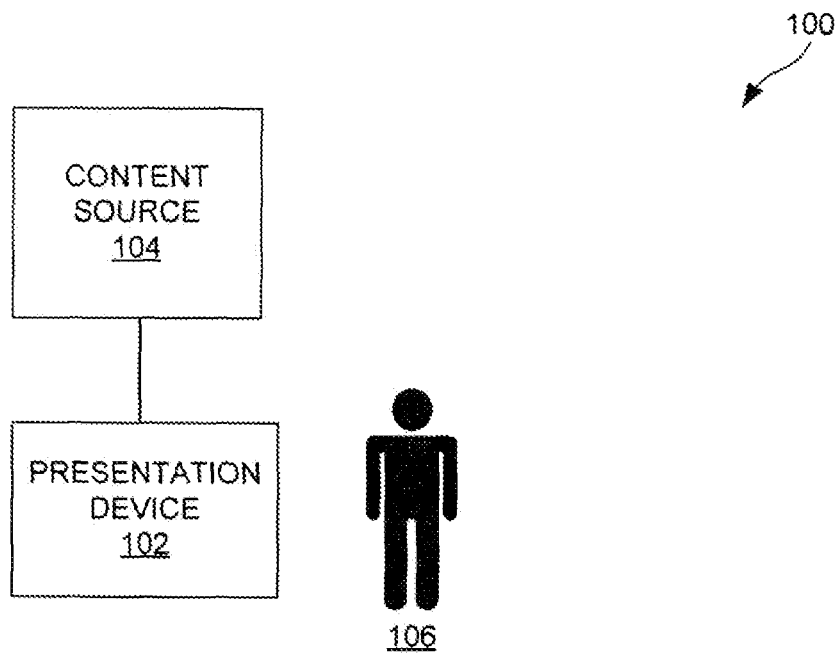
FIG. 1 illustrates an embodiment of an entertainment system.

FIG. 1 illustrates an embodiment of an entertainment system 100. The entertainment system 100 presents content to a user 106. In at least one embodiment, the content presented to the user 106 includes a video stream, such as a television program, movie or other recorded content and the like. The entertainment system 100 includes a presentation device 102 and a content source 104. Each of these components is discussed in greater detail below.

The presentation device 102 is configured to receive content from one or more content source(s) 104, and to present the received content to the user 106. In at least one embodiment, the presentation device 102 is a display device configured to display content to the user 106. In other embodiments, the presentation device 102 is a set-top box (e.g., a satellite or cable television converter box), digital video recorder (DVR) or other similar device that processes and provides one or more audio and/or video streams to a display device for presentation to a user. It is to be appreciated that the presentation device 102 may also be embodied as an apparatus combining the functionality of a display device and a set-top box, DVR or the like.

The presentation device 102 may receive a video stream in any format (e.g., analog or digital format), and present the video stream to the user 106. In at least one embodiment, the presentation device 102 may filter a received video stream to skip portions of the video stream. More particularly, in at least one embodiment, the presentation device 102 may filter a video stream by identifying data in the video stream or associated with the video stream that may be correlated with boundaries for portions of the video stream. For example, the presentation device 102 may parse the text data (e.g., the closed captioning data or subtitles) for a video stream to identify the boundaries for various portions of the video stream. In at least one embodiment, the presentation device 102 may receive metadata including instructions for parsing the text data to identify the boundaries in the video stream. The identified boundaries may then be utilized for determining which portions of the video stream will be presented to the user 106.

The content source 104 may comprise any system or apparatus configured to provide presentation data, such as a video stream, to the presentation device 102. The content source 104 may be external or internal to the presentation device 102. The presentation device 102 and the content source 104 may be communicatively coupled through any type of wired or wireless connection, communication network and the like. Exemplary content sources include television distribution systems (e.g., over the air distribution systems, cable television distribution systems, satellite television distribution systems and broadband distribution systems), DVD players and other optical disk players, digital storage mediums (e.g., DVRs) and the internet. The video stream provided by the content source 104 may include text data, such as subtitles or closed captioning data. The text data may be embedded in the video stream (e.g., in vertical blanking interval line 21 or user data) or may be provided in a separate data stream. In at least one embodiment, the content source 104 may further provide metadata to the presentation device 102 that is utilized for filtering of the video stream. The metadata is discussed in greater detail below. Thus, through the operation of the entertainment system 100, the user 106 is presented with a filtered version of a video or presentation stream. Entertainment system 100 may include other elements or components not illustrated for the sake of brevity.

Figure 2:
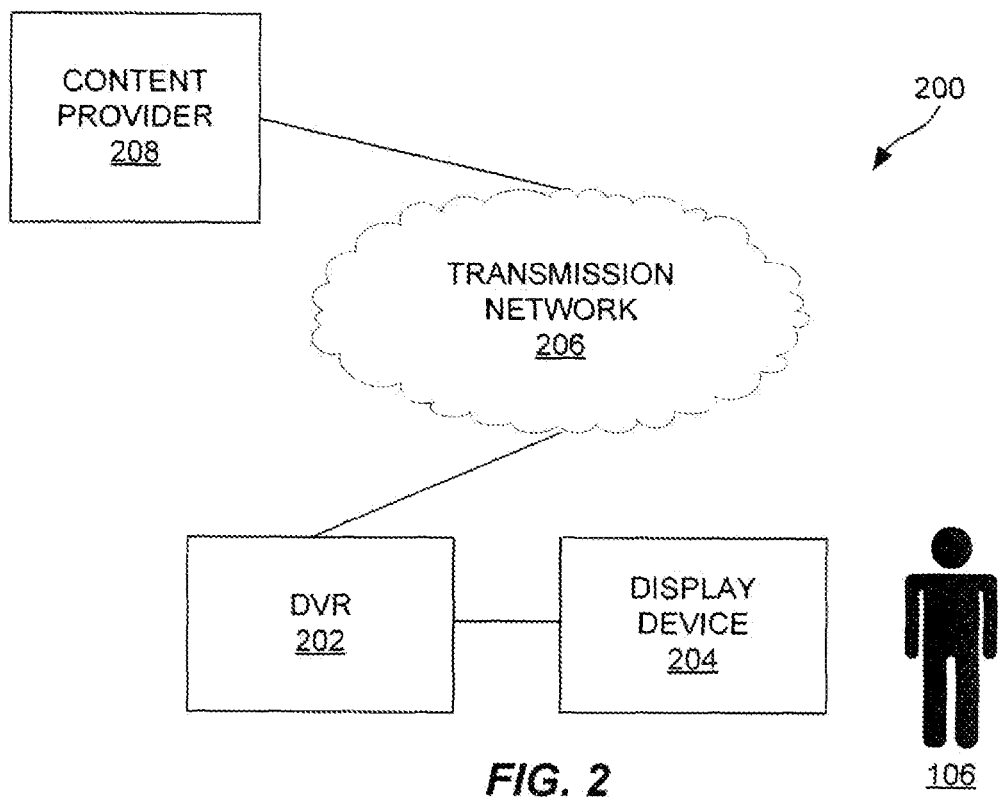
FIG. 2 illustrates an embodiment of a content distribution system.

FIG. 2 illustrates an embodiment of a content distribution system 200. The content distribution system 200 is configured to present a filtered video stream to a user 106. The content distribution system 200 includes a DVR 202, a display device 204, a transmission network 206 and a content provider 208. Each of these components is discussed in greater detail below.

The display device 204 may comprise any type of device operable for receiving and displaying analog and/or digital video signals. In at least one embodiment, the display device 204 may be a television set or video display that contains an integrated television converter device (e.g., an internal cable-ready television tuner housed inside a television), or, alternatively, that is connected to an external television converter device for receiving and demodulating analog and/or digital signals for presentation on the display device 204 (e.g., a set-top box).

Using an integrated television converter device, the display device 204 may be operable to communicate directly with the transmission network 206. For example, the transmission network 206 may comprise an over-the-air distribution system (e.g., free television), and the display device 204 may receive television broadcast signals using an internal or external antenna. The transmission network 206 may also comprise a cable television distribution system, and the display device 204 may comprise a cable ready television adapted to receive and demodulate analog or digital cable television signals for presentation to the user 106. A direct broadcast satellite or other type of wired or wireless communications network may also be used solely or in conjunction with the foregoing. In at least one embodiment, the display device 204 may communicate with the transmission network 206 through an intermediate device, such as a set-top box.

The DVR 202 is communicatively coupled to the display device 204 through any type of wired or wireless connection. Exemplary wired connections include coax, fiber, composite video and high-definition multimedia interface (HDMI). Exemplary wireless connections include WiFi and Bluetooth. In at least one embodiment, the DVR 202 may be embodied in a television converter device (e.g., a satellite television receiver). The DVR 202 may also be incorporated into the display device 204.

The DVR 202 captures and records video content from attached devices onto a storage medium for subsequent presentation to the user 106. As illustrated in FIG. 2, the DVR 202 is coupled to a content provider 208 (e.g., a satellite television provider) through the transmission network 206. Thus, the DVR 202 receives a television signal (e.g., a broadcast) or other data signal (e.g., digital video data or other data formatted into a video stream) from the transmission network 206, and records television programs and other content provided by the content provider 208. The DVR 202 may perform processing functions to parse text data associated with or embedded in the video stream in order to filter portions of the video stream for presentation on the display device 204. It is to be appreciated that the DVR 202 may capture and record video streams from other non-broadcast services, such as video recorders, DVD players, personal computers or the internet.

The DVR 202 may include a remote control or other input device (not shown) that the user 106 may utilize for remotely operating the DVR 202 and/or the display device 204. More specifically, a remote control may be operable for controlling the presentation of video and/or other data presented by the DVR 202 on the display device 204.

The content provider 208 comprises any source or sources of television or other video signals. In at least one embodiment, the content provider 208 provides a television broadcast signal to the DVR 202 over the transmission network 206. The content provider 208 may provide closed captioning data with the television broadcast signal. The content provider 208 may be a television station that generates and provides the content or may be a television service that provides retransmission of television signals (e.g., a satellite television provider). It is to be appreciated that the content provider 208 may also provide some retransmission services while generating and providing some original or derivative content.

The transmission network 206 may comprise any type of communication network utilized between the DVR 202 and the content provider 208. Exemplary communication networks include television distribution networks (e.g., over the air, satellite and cable television networks), wireless communication networks, public switched telephone networks (PSTN), and local area networks (LAN) or wide area networks (WAN) providing data communication services. The transmission network 206 may utilize any desired combination of wired (e.g., cable and fiber) and/or wireless (e.g., cellular, satellite, microwave, and radio frequency) communication mediums and any desired network topology (or topologies when multiple mediums are utilized). The DVR 202 may communicate with the transmission network 206 through a wired or wireless connection. The transmission network 206 may distribute television broadcast and other data signals in digital or analog form. Exemplary video formats include moving picture expert group (MPEG), flash, Windows Media, and the like. Content distribution system 200 may include other elements or components not illustrated for the sake of brevity.

Figure 3:
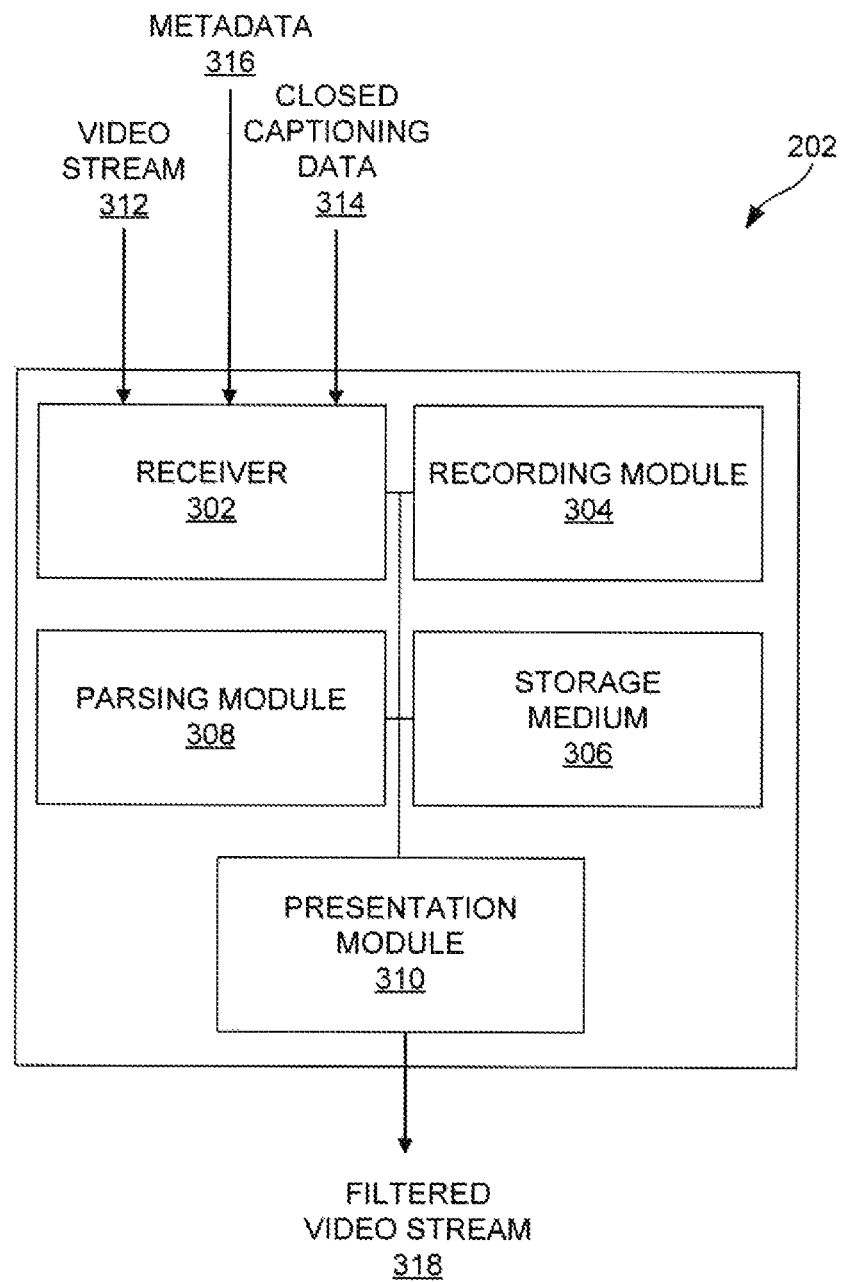
FIG. 3 illustrates an embodiment of functional components of the DVR of FIG. 2.

FIG. 3 illustrates an embodiment of functional components of the DVR 202 of FIG. 2. FIG. 3 will be discussed in reference to the content distribution system 200 illustrated in FIG. 2. The DVR 202 comprises a receiver 302, a recording module 304, a storage medium 306, a parsing module 308 and a presentation module 310. Each of these components is discussed in greater detail below.

The receiver 302 receives a video stream 312 and closed captioning data 314 from the transmission network 206 (see FIG. 2). The receiver 302 may comprise a wired or wireless receiver. In at least one embodiment, the closed captioning data 314 is embedded within the video stream 312. The receiver 302 may further receive other data from the transmission network 206, such as metadata 316 instructing the DVR 202 how to parse the closed captioning data 314 to determine boundaries within the video stream 312.

The recording module 304 receives the video stream 312 and the closed captioning data 314, and stores the video stream 312 and the closed captioning data 314 on the storage medium 306. The storage medium 306 may be any type of temporary or persistent storage device capable of storing the video stream 312 and the closed captioning data 314. The storage medium 306 may be internal and/or external to the DVR 202 and may include one or more storage devices. For example, the storage medium 306 may be an internal hard drive or flash memory. The video stream 312 and the closed captioning data 314 may be stored together and/or separately on the storage medium 306.

The parsing module 308 is configured to index the closed captioning data 314 according to a presentation order. In at least one embodiment, the parsing module 308 indexes the closed captioning data 314 during the recording process. In some embodiments, the parsing module 308 may index the closed captioning data 314 subsequent to recording. For example, the parsing module 308 may index the closed captioning data 314 upon receiving a playback instruction from the user 106 (see FIG. 2). The parsing module 308 is further configured to parse the closed captioning data 314 to identify portions of the video stream to skip and/or present during presentation of the video stream 312 using the metadata 316 sent to the DVR 202.

The presentation module 310 is configured to present recorded video streams to the user 106 (see FIG. 2). The presentation module 310 retrieves the video stream 312 and/or the closed captioning data 314 from the storage medium 306, and presents the content of the video stream 312 to the user 106 (see. FIG. 2). In at least one embodiment, the presentation module 310 receives information from the parsing module 308 identifying portions of the video stream 312 that are to be skipped and/or shown during presentation. The presentation module 310 filters the video stream 312 to skip portions that are designated for skipping, and presents the filtered video stream 318 to the user 106 (see FIG. 2). In at least one embodiment, the presentation module 310 may remove portions of the video stream 312 that are designated for skipping. If applicable, the presentation module 310 also presents the closed captioning data 314 corresponding to the portions of the filtered video stream 318 that are presented to the user 106. In at least one embodiment, the presentation module 310 presents progress bars during presentation on a recording that indicate the locations of the segments, interstitials and/or transition points within a recording.

Those of ordinary skill in the art will appreciate that the various functional elements 302 through 310 shown as operable within the DVR 202 may be combined into fewer discrete elements or may be broken up into a larger number of discrete functional elements as a matter of design choice. For example, the parsing module 308, the recording module 304 and/or the presentation module 310 may be combined into a single processing module. Thus, the particular functional decomposition suggested by FIG. 3 is intended merely as exemplary of one possible functional decomposition of elements within the DVR 202.

Figure 4:
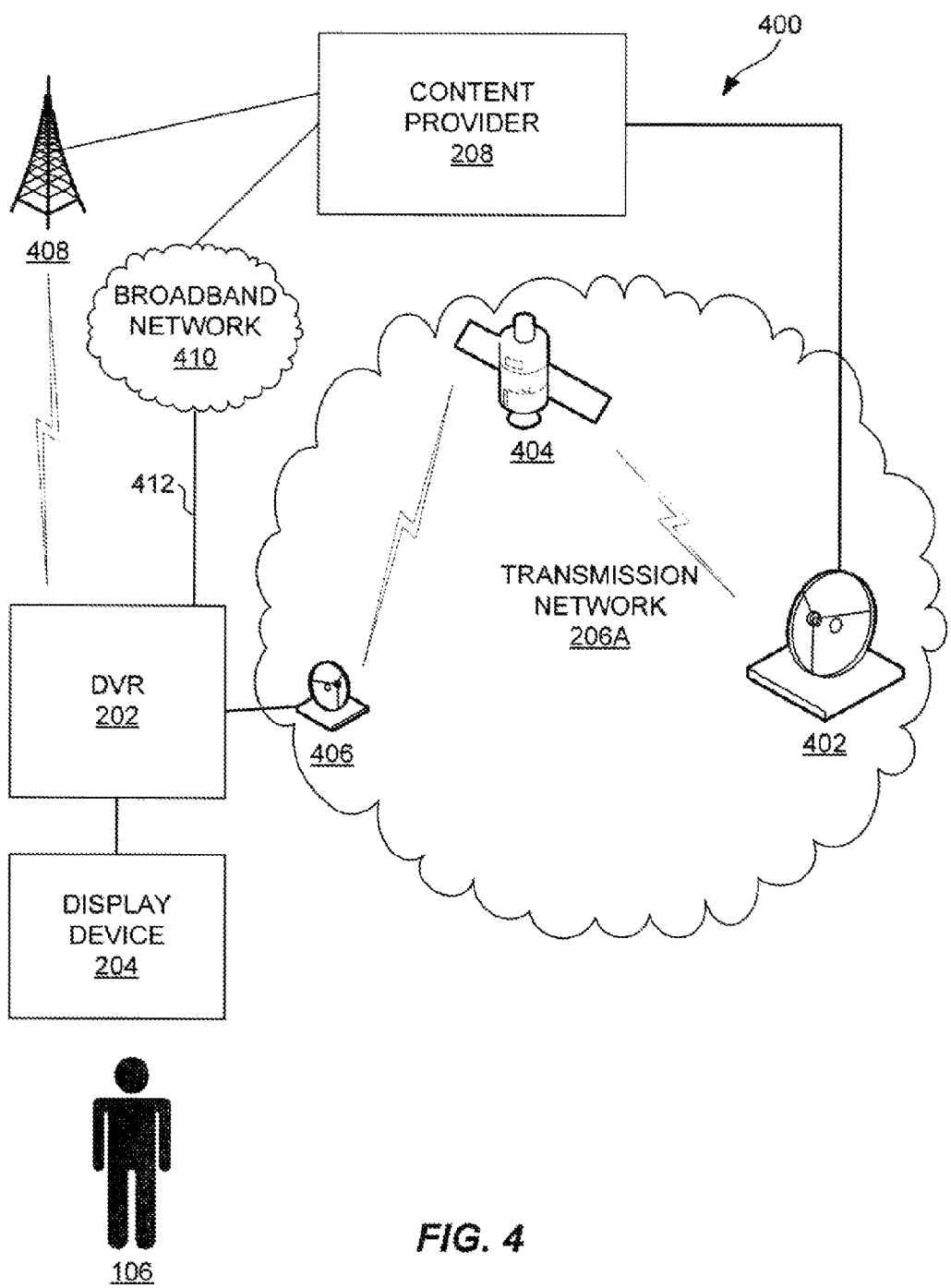
FIG. 4 illustrates an embodiment of a satellite broadcast system.

FIG. 4 illustrates an embodiment of a satellite broadcast system 400. More particularly, FIG. 4 illustrates details of a transmission network 206A. Satellite broadcast system 400 will be discussed in reference to content distribution system 200 illustrated FIGS. 2-3.

Satellite broadcast system 400 includes a content provider 208 in signal communication with an uplink system 402 of a transmission network 206A. The content provider 208 provides the uplink system 402 with television programs transmitted to a DVR 202. Television programs may be broadcast by the transmission network 206A, or may be pushed to the DVR 202 responsive to a request by the user 106. The television program may be embodied as MPEG-2, MPEG-4 or other digital video signals, analog or baseband signals, and/or other video data of a channel of the satellite broadcast system 400.

Satellite broadcast system 400 further comprises a satellite 404 in signal communication with the uplink system 402. The satellite 404 broadcasts television programs received from the uplink system 402. The satellite broadcast system 400 further comprises a satellite antenna 406 for receiving the television program broadcast from the satellite 404. The satellite antenna 406 is in signal communication with the DVR 202, and provides the DVR 202 with the television program. The broadcast television program content is received and stored on the DVR 202, and may be presented on the display device 204 responsive to the user 106 selecting to view the recorded television program. The transmission network 206A may also be configured to transmit metadata and other data to the DVR 202. The metadata may be utilized by the DVR 202 to process the television programming and filter out portions of the television programming.

In at least one embodiment, the DVR 202 may be configured to receive over-the-air television programming from a transmitter 408 using a built in receiver/tuner. For example, the DVR 202 may receive local programming over-the-air, and may receive national programming from the transmission network 206A. In at least one embodiment, the DVR 202 may receive the metadata from the transmitter 408. In some embodiments, the DVR 202 may receive the metadata for the over-the-air programming from the content provider 208 through the transmission network 206A.

As illustrated in FIG. 4, the DVR 202 may optionally be communicatively coupled to the content provider 208 through a broadband network 410 using a broadband connection 412. The broadband connection 412 may be utilized to deliver metadata and/or video programming to the DVR 202. It is to be appreciated that any combination of the described communication paths may be utilized to transmit video programming and/or metadata between the content provider 208 and the DVR 202. For example, the DVR 202 may receive video programming through the transmission network 206A, and may request metadata associated with the video programming from the content provider 208 using the broadband network 410. It is also to be appreciated that the metadata and the video programming may be provided by difference sources (e.g., two different content providers 208).

Transmission network 206 (see FIG. 2) may also be embodied in a cable television distribution system. FIG. 5 illustrates an embodiment of a cable television distribution system 500. More particularly, FIG. 5 illustrates details of a transmission network 206B. Cable television distribution system 500 will be discussed in reference to content distribution system 200 illustrated in FIGS. 2-3.

Cable television distribution system 500 comprises a head-end 502 in signal communication with a content provider 208. The content provider 208 provides the head-end 502 with television programs that are transmitted to the display device 204. Television programs may be broadcast by transmission network 206B, or may be pushed to the DVR 202 responsive to a request by the user 106. Television programs may also be pushed to the DVR 202 using a broadband connection 412 through the broadband network 410.

Cable television distribution system 500 further comprises a local distribution network 504 in signal communication with the head-end 502. The local distribution network 504 is operable for receiving content from the head-end 502 and distributing the content to individual display devices 204. The DVR 202 is in signal communication with the local distribution network 504 using a drop 506 from a feeder line of the local distribution network 504. The local distribution network 504 may provide content as a broadcast to the DVR 202, or may provide content to a specific addressable DVR 202 using the broadband connection 412. In at least one embodiment, the broadband network 410 may be integrated within the transmission network 206B.

Figure 6:
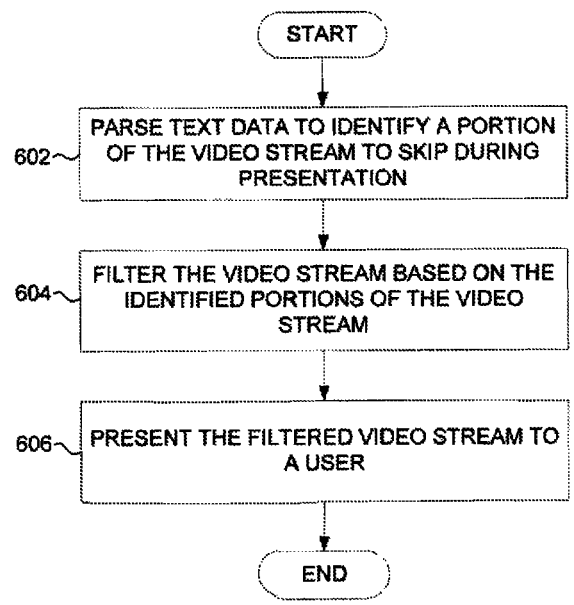
FIG. 6 illustrates an embodiment of a process for filtering a video stream based on text data.

FIG. 6 illustrates an embodiment of a process for filtering a video stream based on text data. The operation of FIG. 6 is discussed in reference to filtering a broadcast television program. However, it is to be appreciated that the operation of the process of FIG. 6 may be applied to filter other types of video stream content, such as DVD videos. The operations of the process of FIG. 6 are not all-inclusive, and may comprise other operations not illustrated for the sake of brevity.

The process includes parsing text data associated with a video stream using the metadata to identify portions of the video stream to skip during presentation of the video stream (operation 602). Operation 602 may be performed to skip portions of a video stream for a variety of reasons. For example, a user may desire to skip commercials, portions of a television program or other content which is of no interest to the user, or portions of the video stream which are offensive or should otherwise not be shown to certain users. In at least one embodiment, operation 602 includes parsing the text data in the video stream that is displayable to a user.

In at least one embodiment, a video stream may include a recording of a contiguous block of programming from a television channel (e.g., an episode of a television show). For example, a DVR may record a single channel between 7:00 and 8:00, which may correspond with a single episode of a television program. An hour long recording may include approximately 42 minutes of video frames of the television program, and approximately 18 minutes of video frames of commercials and other content that is not part of the television program.

The television program may be comprised of multiple segments of video frames, which are interspersed with interstitials (e.g., commercials). As used herein, an interstitial is the video frames of a recording that do not belong to a selected show (e.g., commercials, promotions, alerts, and other shows). A segment of video includes contiguous video frames of the program that are between one or more interstitials.

Illustrated in the table below is one exemplary breakdown of the segments and interstitials within a recording of a one hour television program. For example, the recording may include six segments of the program, each including 7 minutes of video frames. Between each pair of segments is 3 minutes of interstitials. The beginning and ending of the recording includes 1.5 minutes of interstitials.

TABLE #1

Exemplary one hour television recording

| Portion of the recording | Duration (mins) |
|---|---|
| Interstitial #1 | 1.5 |
| Segment #1 | 7 |
| Interstitial #2 | 3 |
| Segment #2 | 7 |
| Interstitial #3 | 3 |
| Segment #3 | 7 |
| Interstitial #4 | 3 |
| Segment #4 | 7 |
| Interstitial #5 | 3 |
| Segment #5 | 7 |
| Interstitial #6 | 3 |
| Segment #6 | 7 |
| Interstitial #7 | 1.5 |
| Total duration | 60 |

A string included within the text data may be utilized to identify specific locations within the video stream. The marked location may be located within a portion of the video stream that is designated for presentation (e.g., part of a television program), or may be within a portion of the video stream that is designated for skipping (e.g., in a portion of the program that a user does not desire to view).

For example, a string may identify a location within segment #1. Once the location is identified within segment #1, the boundaries of segment #1 may be determined. In at least one embodiment, the boundaries of segment #1 are identified using offsets relative to the identified location of a string. For example, if the identified location of the string in segment #1 is 6 minutes into the one hour recording, then an offset of 4.5 minutes prior to the location of the string describes the beginning of segment #1. Likewise, an offset of 2.5 minutes after the location of the string describes the ending of segment #1. A similar process may be utilized with additional strings and offsets to locate the boundaries of the other segments of the video streams. In at least one embodiment, multiple anchor frames, each having different starting and ending offset times, may be utilized within one segment for redundancy.

Thus, the parsing process identifies portions of the video stream that are to be skipped during presentation to a user. In the example illustrated in table #1, operation 602 identifies interstitials #1-7 for skipping during presentation of the video stream. It is to be appreciated that other techniques may also be utilized to determine the boundaries of a segment once a location is identified by the parsing process. For example, a first string may be utilized to identify the location of the beginning boundary of the segment, and a second string may be utilized to identify the location of the ending boundary of the string.

Once the parsing process is complete, portions of the video stream may be filtered prior to presentation. The process further includes filtering the video stream based on the identified portions of the video stream (operation 604) to generate a filtered video stream. The process further includes presenting the filtered video stream to a user (operation 606).

As described above, interstitials #1-7 are designated for skipping during the presentation of the video stream. Thus, segments #1-6 will be presented to the user without the interstitials presented between each segment. The presentation of the television program will start at the beginning of segment #1 (1.5 minutes into the recording), skipping the video frames of interstitial #1. After the ending of segment #1, the presentation will continue at the beginning of segment #2. Therefore, the television user doesn't see the video frames of interstitial #2. In at least one embodiment, an indicator, such as a small icon displayed in a corner of the screen, may be presented to a user to indicate that a portion of the video stream was skipped during the presentation.

Figure 7:
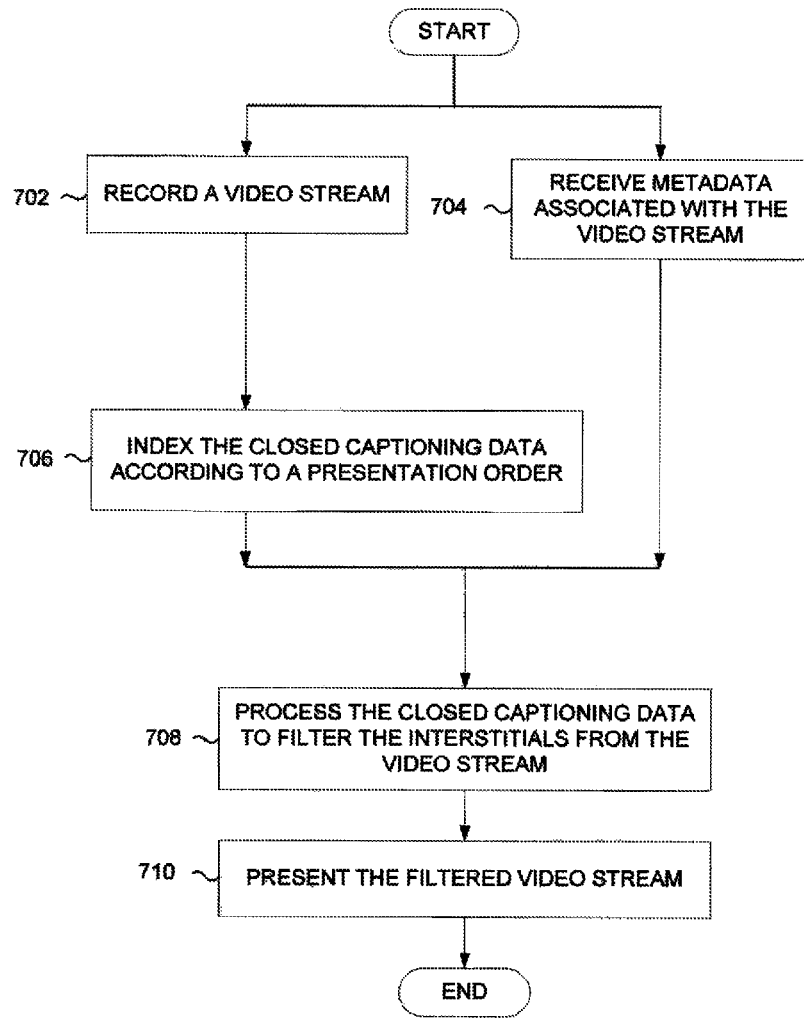
FIG. 7 illustrates an embodiment of a process for filtering interstitials from a video stream based on text data.

FIG. 7 illustrates an embodiment of a process for filtering interstitials from a video stream based on text data. The operation of FIG. 7 is discussed in reference to filtering a broadcast television program. However, it is to be appreciated that the operation of the process of FIG. 7 may be applied to filter other types of video stream content. The operations of the process of FIG. 7 are not all-inclusive, and may comprise other operations not illustrated for the sake of brevity.

The process includes recording a video stream including at least one segment of a show, at least one interstitial of the show, and closed captioning data associated with the segments of the show (operation 702).

The process further includes receiving metadata associated with the video stream that identifies the boundaries of the segments of the show (operation 704). In at least one embodiment, for each segment of the show, the metadata includes a string located within the segment, and a beginning and an ending offset from the string that identifies the boundaries of the segment. Offsets are utilized, because the actual presentation times of the beginning and ending boundaries of the segment may change due to many factors, which are discussed in greater detail below. Operations 702 and 704 may be performed in parallel, or sequentially in either order. For example, the metadata may be received prior to recording the video stream, subsequently to recording the video stream, or at the same time as the video stream.

The process further includes indexing the closed captioning data according to a presentation order (operation 706). Closed captioning data is typically transmitted in two or four byte intervals associated with particular video frames. Because video frames don't always arrive in their presentation order, the closed captioning data is sorted according to the presentation order (e.g., by a presentation time stamp) of the closed captioning data. In at least one embodiment, the indexing process may be performed responsive to receiving the metadata in step 704. Thus, a DVR may not perform the indexing process unless the metadata used to filter the video stream is available for processing. In other embodiments, the closed captioning data may be indexed before the metadata arrives at the DVR. For example, the indexing may be performed in real-time during recording. In at least one embodiment, the sorted closed captioning data is stored in a file and associated with the recorded video stream.

The process further includes processing the closed captioning data, to filter the interstitials from the recorded video stream, based on the metadata, to generate a filtered video stream (operation 708). It is to be appreciated that operation 708 may identify either the boundaries of the segments of the interstitials or the segments of the show to filter the interstitials from the video stream.

In at least one embodiment, operation 708 may include creating segment bookmarks that mark the start and end of a segment. A segment bookmark is a structure created by the recording software. A start segment bookmark points to the start of the segment, and an end segment bookmark points to the end of a segment. The metadata for a segment includes information that specifies the boundaries of one segment. More specifically, in at least one embodiment, the metadata includes a string (which may be unique within the closed captioning data of the recording, or unique within the segments of the show), that is associated with an anchor frame. As used herein, an anchor frame refers to a video frame that contains selected bytes of a selected closed captioning string. In at least one embodiment, the anchor frame contains the last bytes of the closed captioning string. It is to be appreciated that the anchor frame may be a show frame within the segment, or may be a skip frame within the segment.

By locating the anchor frame, the beginning bookmark may be created based on the anchor frame and the beginning offset. Likewise, the ending bookmark may be created based on the anchor frame and the ending offset. The video frames between a beginning bookmark and an ending bookmark may define the portions of the video stream that are presented to a user.

The process further includes presenting the filtered video stream to a user (operation 710). If segment bookmarks are created, the presentation process includes presenting the segment of the video stream between the beginning bookmark and the ending bookmark. Because the interstitial portions of the video stream are not included within the bookmarks for a segment, they are excluded from presentation to the user.

As described above, the actual presentation times of each segment of a television program within different recordings may vary. For example, two users may not begin recording a program at the same exact points in a broadcast. Thus, there may be a difference in the video frames contained within the recording made by each viewer. Also, many nationally televised shows are broadcast by affiliates of a broadcast network. The broadcast network may have different affiliates in each television market around the country. Each affiliate has some discretion in the location of the interstitials of the television program, and is allowed to insert some of their own content (e.g., local commercials) into various portions of the time slot of the television program. For example, an affiliate may make one of the commercial breaks longer than commercial breaks of other affiliates to accommodate a longer portion of local content, and likewise may make another commercial break shorter in order to offset the difference. Thus, when a television program is recorded in Denver, the recording may not be the same as a television program recorded in New York City.

Table #2 illustrates two exemplary break downs of interstitial and segment durations for two different affiliates transmitting the same television program in two different markets. The duration of each segment doesn't change, but the duration (and content) of each interstitial is different for the two affiliates. Table #3 illustrates exemplary segment and interstitial starting and ending times for each affiliate illustrated in FIG. 2. For example, viewers in NYC and Denver may begin watching or recording a program at 7:00 in their respective time zones. The viewer in NYC will see the beginning of the first segment of the program at 1.5 minutes into the recording, while the viewer in Denver will see the beginning of the first segment of the program at 1 minute into the recording. Regardless of the starting time of the segment, both viewers will see the same content of the segment for the seven minutes following the start of the segment.

TABLE #2

Exemplary one hour recording of a television program for two affiliates.

| Portion of program | Duration (NYC) | Duration (Denver) |
|---|---|---|
| Interstitial #1 | 1.5 | 1 |
| Segment #1 | 7 | 7 |
| Interstitial #2 | 3 | 3 |
| Segment #2 | 7 | 7 |
| Interstitial #3 | 3 | 4 |
| Segment #3 | 7 | 7 |
| Interstitial #4 | 3 | 3 |
| Segment #4 | 7 | 7 |
| Interstitial #5 | 3 | 2.5 |
| Segment #5 | 7 | 7 |
| Interstitial #6 | 3 | 4 |
| Segment #6 | 7 | 7 |
| Interstitial #7 | 1.5 | 0.5 |
| Total duration | 60 | 60 |

TABLE #3

Exemplary segment and interstitial starting and ending times for a recording from each affiliate.

| Portion of program | Start NYC | End NYC | Start Denver | End Denver |
|---|---|---|---|---|
| Interstitial #1 | 0 | 1.5 | 0 | 1 |
| Segment #1 | 1.5 | 8.5 | 1 | 8 |
| Interstitial #2 | 8.5 | 11.5 | 8 | 11 |
| Segment #2 | 11.5 | 18.5 | 11 | 18 |
| Interstitial #3 | 18.5 | 21.5 | 18 | 22 |
| Segment #3 | 21.5 | 28.5 | 22 | 29 |
| Interstitial #4 | 28.5 | 31.5 | 29 | 32 |
| Segment #4 | 31.5 | 38.5 | 32 | 39 |
| Interstitial #5 | 38.5 | 41.5 | 39 | 41.5 |
| Segment #5 | 41.5 | 48.5 | 41.5 | 48.5 |
| Interstitial #6 | 48.5 | 51.5 | 48.5 | 52.5 |
| Segment #6 | 51.5 | 58.5 | 52.5 | 59.5 |
| Interstitial #7 | 58.5 | 60 | 59.5 | 60 |

The process of FIG. 7 operates to identify an anchor frame within each segment of the television program. Beginning and ending offsets relative to each anchor frame are then utilized to create beginning and ending bookmarks for the segment. Because the duration and content of each segment is the same, the beginning and the ending of the segment will be the same offset relative to the anchor frame regardless of the presentation times of the anchor frame. For example, an anchor frame for segment #1 may be 2 minutes into the segment (relative to the beginning of the segment). In NYC, this means that the anchor frame has a presentation time of 3.5 minutes into the recording. However, in Denver, the anchor frame has a presentation time of 3 minutes into the recording. Beginning and ending offsets having the same duration are still utilized in both markets, so the beginning bookmark for the NYC recording is created at a presentation time of 1.5 minutes into the recording, and the beginning bookmark for the Denver recording is created at a presentation time of 1.0 minutes into the recording. Thus, each viewer skips over different duration interstitials #1, and begins viewing the same frame of segment #1.

In at least one embodiment, the metadata that includes the strings and offsets utilized to identify the boundaries of a segment may be transmitted to a DVR through a metadata stream and the like. The data that identifies the boundaries of a segment is referred to herein as segment metadata. The show metadata, which may be delivered via a metadata stream, may include segment metadata for one or more segments of the show, and other information, such as the unique program ID (UPID) for the program. Each show may be identified by a UPID. A recording (e.g., one file recorded by a DVR between 7:00 and 8:00) may include multiple UPIDs. For example, if a television program doesn't start exactly at the hour, then the DVR may capture a portion of a program having a different UPID. The UPID allows a DVR to associate a particular show with its corresponding metadata.

Illustrated in table #4 is one exemplary format for segment metadata utilized by the processes of FIGS. 6-7. The segment metadata is carried in the segment_descriptor( ). For error handling in the case of stream corruption or censoring of offensive closed captioning by local affiliates, multiple segment_descriptor( ) may be utilized for a segment. If there are multiple segment_descriptor( ) for a given segment, then the segment_number will be the same for each but the cc_string[ ], start_offset, and end_offset will be different. Basically, alternate anchor frames may be specified for a given segment.

TABLE #4

Example of segment metadata structure.

| syntax | no. of bits | mnemonic |
|---|---|---|
| segment_descriptor( ) | | |
| { | | |
| segment_tag | 8 | uimsbf |
| segment_length | 8 | uimsbf |
| segment_number | 8 | uimsbf |
| last_segment_number | 8 | uimsbf |
| cc_string_length | 8 | uimsbf |
| cc_string[ ] | cc_string_length*8 | char string |
| start_offset | 32 | uimsbf |
| end_offset | 32 | uimsbf |
| } | | | segment_tag - 0xC1
segment_length - The number of bytes in the segment_descriptor( ) after this field.
segment_number - A show normally consists of multiple segments. The segment metadata will be numbered 1 to N in time order (e.g., 1 = first (earliest) segment, N = last (latest) segment).
last_segment_number - The number of the last segment_number.
cc_string_length - The number of bytes in the closed captioning string (cc_string[ ]).
cc_string[ ] - The closed captioning bytes in presentation order (not transmission order). The string may include all the bytes carried in a video frame (2 or 4), and may include the bytes from multiple video frames. The string may contain closed captioning bytes from enough video frames to make the string unique within the segment.
start_offset - The number of presentation time stamps (PTS) ticks 1/90000 s) from the anchor frame to the video frame that starts the segment. The start_offset points backwards in the recording from the anchor frame.
end_offset - The number of PTS ticks from the anchor frame to the video frame that starts the interstitial immediately after the segment. The end_offset points forward in the recording.

Figure 8:
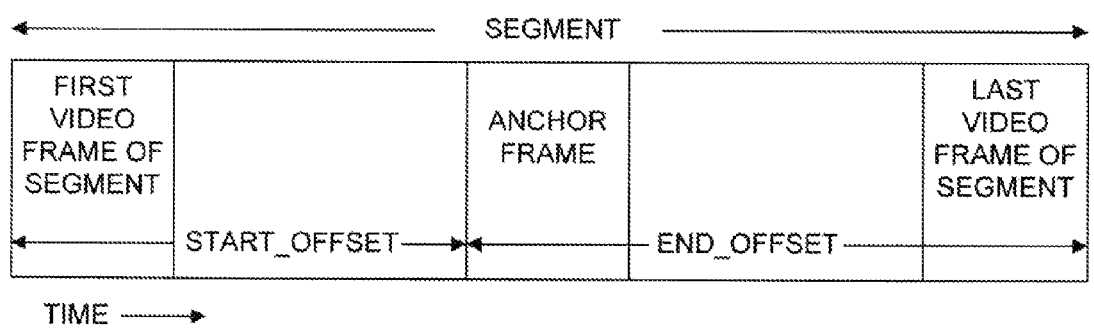
FIG. 8 illustrates the relationship between the variables of the segment metadata.

FIG. 8 illustrates the relationship between the variables of the segment metadata. However, it is to be appreciated the other exemplary data formats may be utilized for the segment metadata. FIG. 9 illustrates an example of a metadata stream transmitted to a DVR. A program_unique_id_descriptor( ) uniquely identifies the show so that the metadata stream may be associated with the correct recording file. The package type in the described example is "Show Metadata".

In at least one embodiment, the DVR records an event, and monitors the metadata stream for "Show Metadata". If corresponding metadata is found, then the metadata is processed to create segment bookmarks for the show. The segment bookmarks are then utilized to skip the interstitials of the show.

The metadata stream carrying the show metadata may be delivered at any time. Thus, the metadata stream may arrive at a DVR, before, during or after a recording is made. If the metadata stream arrives at the DVR prior to an airing of the show, then the show metadata may be saved for future use should a user later decide to record the show. If a metadata stream arrives at the DVR after the show airs, then the DVR can process the metadata stream to determine whether that particular show has been recorded. If the show has been recorded, then the DVR may begin processing the metadata stream to generate the segment bookmarks. If the show has not been recorded, then the metadata stream may be discarded if the show metadata is not needed by the DVR.

In at least one embodiment, the metadata is stored on a server and delivered responsive to a request from the DVR. For example, the DVR may request the metadata from a server when it records a selected program. The metadata is then delivered to the DVR from the server and utilized to parse the closed captioning data.

A DVR may index the closed captioning data before parsing the closed captioning data. Table 5 illustrates exemplary information utilized to index the closed captioning data.

TABLE #5

Start code detector information

| Information | Comments |
| --- | --- |
| Size | The number of closed captioning bytes in the video frame (2 or 4). |
| Closed captioning (CC) bytes | The undecoded (i.e., encoded) closed captioning bytes in the video frame. |
| PTS | The PTS of the video frame that carries the closed captioning bytes. |
| Offset | The byte offset into the transport packet stream to the first transport packet of the video frame that carries the closed captioning bytes. |

In at least one embodiment, the DVR may filter the closed captioning stream and discard pairs of NULL (value=0x80) closed captioning bytes. There may be 2 or 4 closed captioning bytes per video frame. If the frame contains 2 closed captioning bytes, and both bytes are equal to 0x80, then the bytes may be discarded and not saved. Otherwise, both closed captioning bytes are saved. If the frame contains 4 closed captioning bytes, and the first two bytes are equal to 0x80, then the first two bytes will be discarded and not saved. Otherwise, the first two closed captioning bytes are saved. If the second two bytes are equal to 0x80, then the second two bytes are discarded and not saved. Otherwise the second two closed captioning bytes are saved. The DVR may sort the closed captioning stream so that the closed captioning bytes are in the presentation order. This is because the presentation order is utilized in the segment metadata. The PTS may be used to sort the closed captioning bytes into the presentation order.

The filtered and sorted closed captioning stream may be saved to a storage medium of the DVR, and associated with the recording of the video stream. Illustrated below is an exemplary array structure for storing the filtered, sorted, and indexed closed captioning stream. However, it is to be appreciated that other storage structures may also be utilized.

```
struct cc_s
{
    int n; // number of closed captioning bytes in the closed captioning
        buffer (2 or 4)
    u8 cc[4]; // the undecoded closed captioning bytes (unsigned char
        data type)
    s64 pts; // 33-bit PTS of the video frame (long long data type)
    u64 offset; // zero-based (0 = 1st byte) offset into the recording
};
```

As described above, segment bookmarks may be utilized to mark the beginning and ending of a segment. Table #6 illustrates exemplary information contained in the segment bookmarks. It is to be appreciated however, that the segment bookmarks may contain other information than listed in table #6.

TABLE #6

Segment bookmark information

| Information | Comments |
| --- | --- |
| Start or End flag | Designates this bookmark as starting a segment or ending a segment. |
| PTS | The PTS of the video frame that starts/ends the segment. |
| Offset | The byte offset into the recording. |

Figure 10:
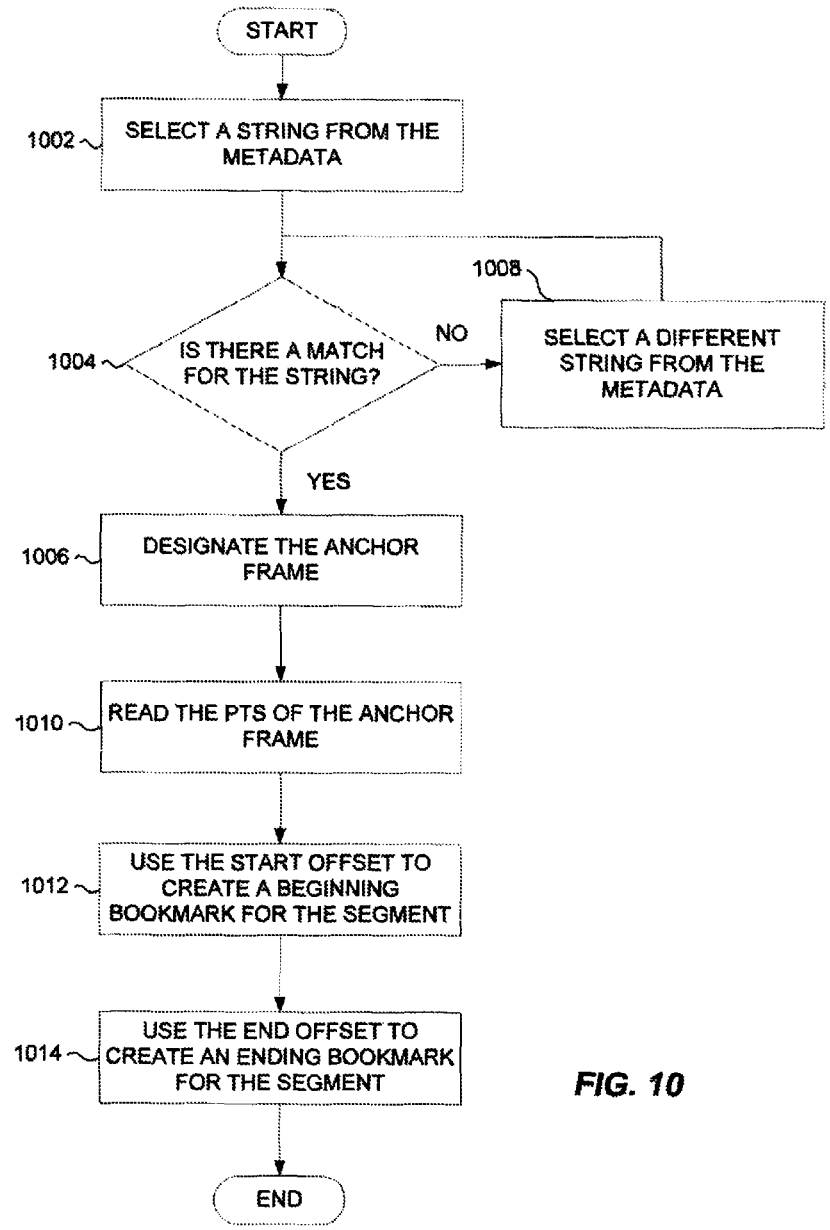
FIG. 10 illustrates an embodiment of a process for creating segment bookmarks of a recording.

FIG. 10 illustrates an embodiment of a process for creating segment bookmarks of a recording. The operation of FIG. 10 is discussed in reference to segment bookmarks for a television program. However, it is to be appreciated that the operation of the process of FIG. 10 may be applied to create segment bookmarks for other types of video stream content. Further, the operations of FIG. 10 are discussed in reference to particular data structures illustrated above. It is to be appreciated, however, that the operations of FIG. 10 may be utilized in accordance with any types of data structures and other suitable types of data. The operations of the process of FIG. 10 are not all-inclusive, and may comprise other operations not illustrated for the sake of brevity.

After recording a show, an index of the closed captioning data for the show and the show metadata associated with the program is processed to create segment bookmarks for each segment of the show. In at least one embodiment, the show metadata is processed in segment_number order, 1 to N, to create the segment bookmarks for the show.

The process includes selecting a string from the metadata for use in identifying a segment (operation 1002). This is selected from a segment_descriptor( ). The process further includes matching the cc_string[ ] from the segment_descriptor( ) to the closed captioning bytes in the index of the closed captioning data (operation 1004). If a match is found, then the video frame indexed by the closed captioning data is designated as the anchor frame (operation 1006). If a match is not found, then an alternate segment_descriptor( ) if one exists, may be utilized to select an alternate anchor frame (operation 1008), and processing continues at operation 1004. The show metadata may include multiple segment_descriptor( ) in case there are transmission problems with the closed captioning data. For example, if one or more closed captioning bytes transmitted by a content provider are not received by a DVR, then a match of a segment_descriptor( ) may not be found. Thus, an alternate segment_descriptor( ) may be utilized to locate an alternate anchor frame in the segment.

The process further includes determining the PTS of the selected anchor frame (operation 1010). The PTS may be determined from either the video stream, or through the closed captioning data index file. The process further includes creating the beginning bookmark of the segment (operation 1012). The PTS of the video frame at the start of the segment is determined by taking the PTS of the anchor frame and subtracting the start_offset from the segment_descriptor( ). The beginning bookmark points to the PTS of the video frame at the start of the segment. The process further includes creating the ending bookmark of the segment (operation 1014). The PTS of the video frame at the end of the segment is determined by taking the PTS of the anchor frame and adding the end_offset from the segment_descriptor( ). The ending bookmark points to the PTS of the video frame at the end of the segment. In at least one embodiment, modulo arithmetic is utilized to handle cases where the PTS rolls. The segment bookmarks may be created once, and utilized multiple times if the user desires to watch a program on more than one occasion. The operations of the process of FIG. 10 are repeated for any remaining segments (e.g., any remaining segment_descriptor( ) fields for segments that have not been processed).

Identifying the location of the segments and the interstitials of a recording allows for the presentation to a user of the location information and other information, such as the durations of segments and interstitials. For example, the location of the interstitials within a recording may be provided in a progress bar during playback of the recording. A user may utilize this information while navigating through a recording, regardless of whether the interstitials are automatically filtered by a DVR.

Figure 11:
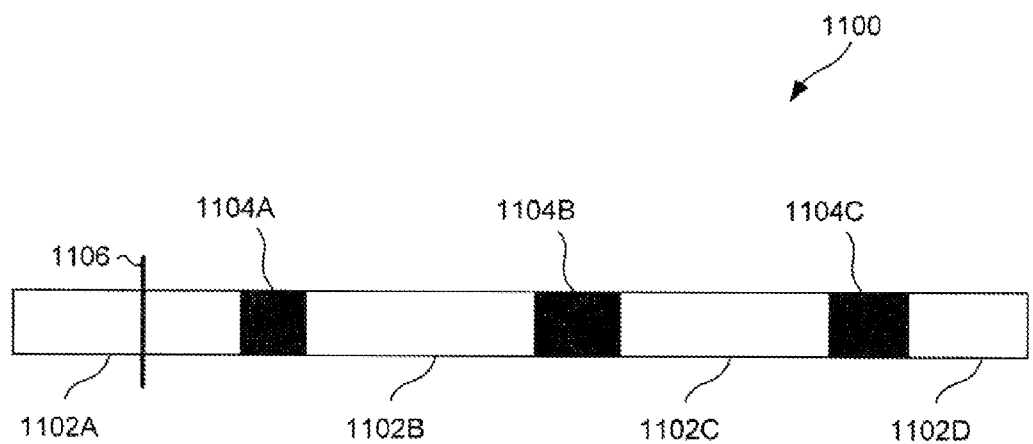
FIG. 11 illustrates an embodiment of a progress bar.

FIG. 11 illustrates an embodiment of a progress bar 1100. The progress bar 1100 presents the location of the segments 1102A-1102D of a recording. The progress bar 1100 also presents the location of the interstitials 1102A-1102D of the recording. A cursor 1106 indicates the current playback position within the recording. In at least one embodiment, a first indicator is utilized to illustrate the segments 1102A-1102D, and a second indicator is utilized to illustrate the interstitials 1104A-1104C of the recording. For example, the segments 1102A-1102D may be presented as white shapes, while the interstitials 1104A-1104C may be presented as darker colored shapes, such as black or grey.

Figure 12:
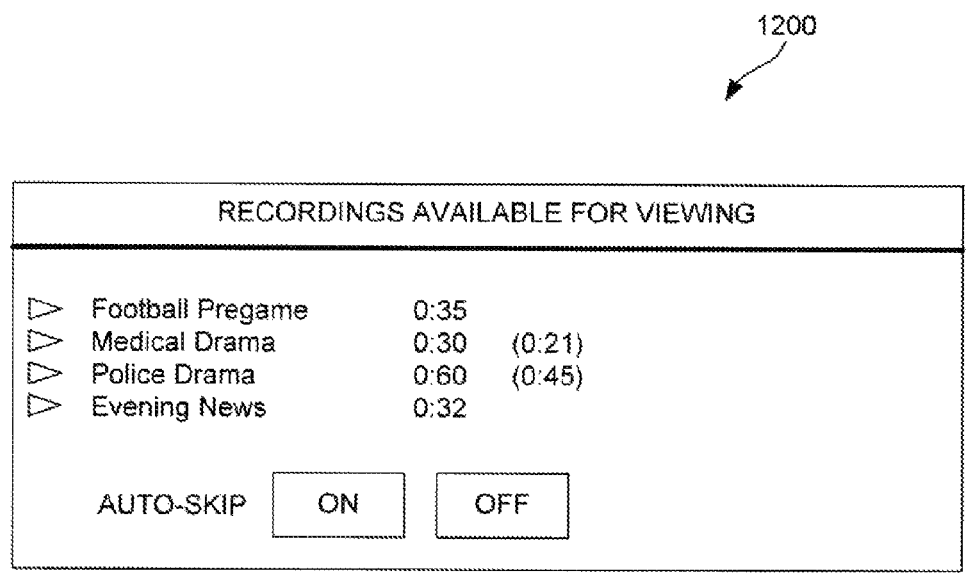
FIG. 12 illustrates a menu of recordings on a DVR available for playback.

FIG. 12 illustrates a menu 1200 of recordings on a DVR available for playback. The menu 1200 illustrates four recordings of television shows which are available for viewing by a user. For each recording, the menu 1200 presents a name of the recording (e.g., a name of the television show) and a total duration of the recording. If a recording has an "auto-skip" feature available, then the menu 1200 also presents a duration of a filtered version of the recording (e.g., with no interstitials). For example, in the menu 1200, the Football Pregame has a total duration of 0:35, and an auto-skip feature is not available for this recording. Similarly, the Evening News has a total duration of 0:32, and a filtered version of this recording is unavailable. For the Medical Drama, the recording has a duration of 0:30, and the filtered version of the recording has a duration of 0:21. Likewise, the Police Drama has a duration of 0:60, and the filtered version has a duration of 0:45. The information presented in the menu 1200 allows a user to accurately determine how long it will take to watch the various versions of the recordings. It is to be appreciated that the timing information may be provided to a user in other screens of the DVR, such as a description screen regarding a particular recording.

Figure 13:
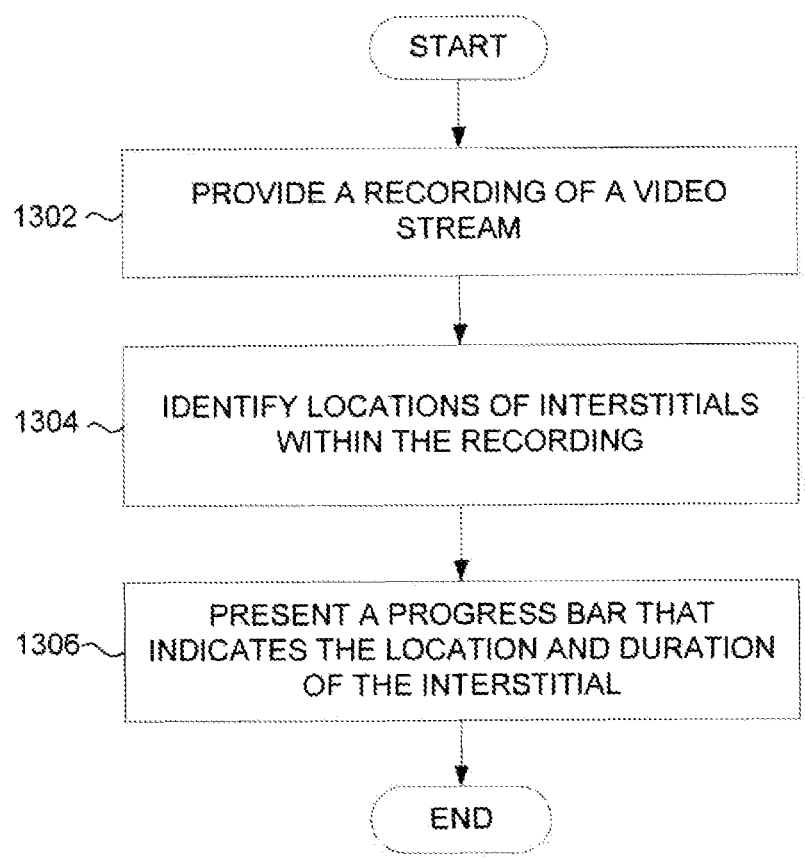
FIG. 13 illustrates an embodiment of a process for providing a user with locations of interstitials in a video stream of a show.

FIG. 13 illustrates an embodiment of a process for providing a user with locations of interstitials in a video stream of a show. The operations of the process of FIG. 13 are not all-inclusive, and may comprise other operations not illustrated for the sake of brevity.

The process includes providing a recording of a video stream including at least one segment of the show and at least one interstitial of the show (operation 1302). In at least one embodiment, operation 1302 may include recording the video stream and capturing text data associated with the video stream (e.g., closed captioning data).

The process further includes identifying a location of at least one interstitial within the recording (operation 1304). In at least one embodiment, operation 1304 may include parsing text data associated with the video stream to identify the location of the interstitials (and/or transitions between interstitials and segments) within the recording. More particularly, in at least one embodiment, parsing the text data to identify locations of the interstitials (and/or transition points between interstitials and segments of the show may be performed as described in the process of FIG. 10.

The process further includes presenting a progress bar during presentation of the video stream that indicates the locations of the interstitials within the recording (operation 1306). In at least one embodiment, the locations of the interstitials are presented using a different indicator than the location of the segments of the show within the recording (e.g., in different colors). The process may optionally include determining a duration of the interstitial, and presenting the duration of the interstitial in association with the presentation of the video stream. For example, the duration of the interstitial may be overlaid on a portion of the progress bar that indicates the location of the interstitial.

Figure 14:
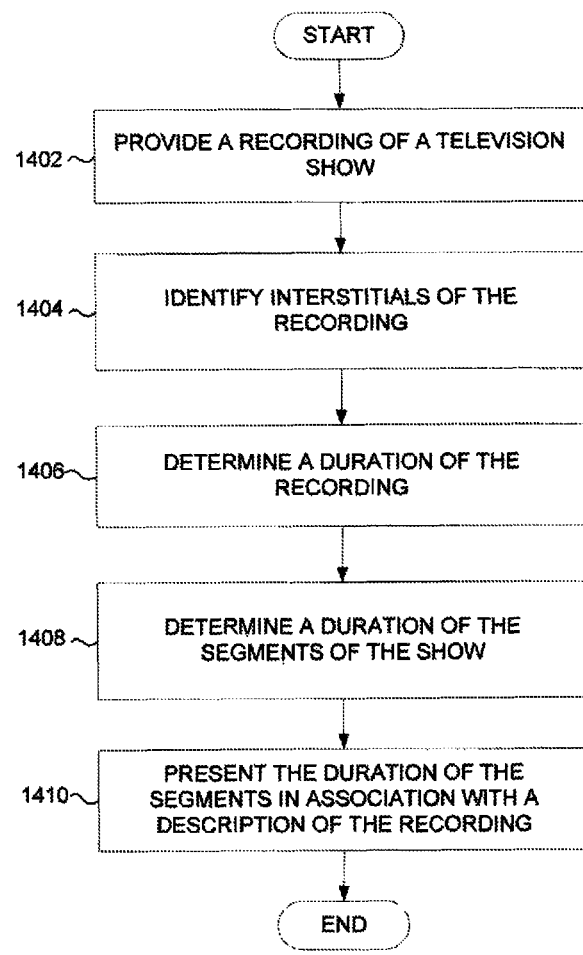
FIG. 14 illustrates an embodiment of a process for presenting information regarding a recorded television show.

FIG. 14 illustrates an embodiment of a process for presenting information regarding a recorded television show. While the operation of the process of FIG. 14 is described in reference to a television show, it is to be appreciated that the process may be applied to present information regarding any type of video content. The operations of the process of FIG. 14 are not all-inclusive, and may comprise other operations not illustrated for the sake of brevity.

The process includes providing a recording of a television show (operation 1402). The recording may include at least one segment of the show, at least one interstitial and text data associated with the segments and/or interstitials. In at least one embodiment, operation 1402 may include identifying the recording stored on a storage medium of a DVR, and determining which of the recordings include identifiable interstitials.

The process further includes identifying the interstitials of the recording (operation 1404). In at least one embodiment, the identification process may be performed based on the text data associated with the video stream, as described above.

The process further includes determining a duration of the recording (operation 1406). The process further includes determining a duration of the segments of the recording (operation 1408). In at least one embodiment, the durations of the segments are determined from information in the metadata. The segment durations indicated in the metadata may be added together to determine the total segment durations for the show. In some embodiments, the durations of the segments are determined by calculating the durations of the interstitials of the recording, and subtracting the duration of the interstitials from the total duration of the recording. This may be performed in conjunction with or separately from an interstitial filtering process. Thus, in at least one embodiment, the duration of the segments is essentially the duration of the video frames of the recording that do not include interstitial content.

The process further includes presenting the duration of the segments of the show in association with a description of the recording (operation 1410). In at least one embodiment, operation 1410 may also include presenting the total duration of the recording, and/or the total duration of the interstitials of the recording. Thus, if interstitials are to be filtered from the recording, then a user will be presented with the duration of the remaining content of the recording. However, it is to be appreciated that the process of FIG. 14 may be utilized separately from the filtering processes described above.

Although specific embodiments were described herein, the scope of the invention is not limited to those specific embodiments. The scope of the invention is defined by the following claims and any equivalents therein.

What is claimed is:

1. A method for providing a user with locations of interstitials in a video stream of a show, the method comprising:
   receiving a video stream including at least one segment of a show, at least one interstitial of the show, and closed captioning data associated with the video stream;
   receiving metadata referencing the closed captioning data to identify a first anchor frame and a second anchor frame within a segment of the show, the metadata comprising a first displayable text string that is unique for the segment and a second displayable text string that is unique for the segment, the first and second displayable text strings included within the closed captioning data as originally transmitted by a content provider, and the metadata further comprising a first offset, relative to the first anchor frame, that identifies a beginning of the segment, and a second offset, relative to the second anchor frame, that identifies an ending of the segment;
   parsing the closed captioning data associated with the video stream to locate the first anchor frame in the segment, corresponding with the presentation of the first displayable text string located in the closed captioning data;
   identifying a beginning boundary of the segment based on the located first anchor frame and the first offset;
   parsing the closed captioning data associated with the video stream to locate the second anchor frame in the segment, corresponding with the presentation of the second displayable text string located in the closed captioning data;
   identifying an ending boundary of the segment based on the located second anchor frame and the second offset;
   identifying a location of the at least one interstitial based on the identified beginning and ending boundaries;
   outputting the video stream for presentation to a user; and
   outputting a progress bar during output of the video stream that indicates the location of the at least one interstitial within the recording and a duration of the at least one interstitial.

2. The method of claim 1, further comprising:
   filtering the at least one interstitial from the video stream based on the identified beginning and ending boundaries to generate a filtered video stream; and
   outputting the filtered video stream to a user.

3. The method of claim 1, further comprising:
   outputting the location of the at least one interstitial using a first indicator; and
   outputting a location of the at least one segment using a second indicator.

4. The method of claim 1, wherein each of the first and second anchor frames is associated with a presentation location of the last two bytes of the respective displayable text string in the video stream.

5. The method of claim 1, wherein parsing the closed captioning data associated with the video stream further comprises:
   indexing the closed captioning data according to a presentation order to generate indexed closed captioning data;
   discarding null closed captioning bytes from the indexed closed captioning data; and
   parsing the indexed closed captioning data to identify the first and second anchor frames.

6. A method for providing a user with locations of interstitials in a video stream of a show, the method comprising:
   receiving a video stream including first and second segments of a show, at least one interstitial of the show temporally positioned between the first and second segments, and closed captioning data associated with the video stream;
   receiving metadata referencing the closed captioning data to identify first and second anchor frames within the video stream, the metadata comprising first and second displayable text strings included within the closed captioning data as originally transmitted by a content provider, and the metadata further comprising a first offset relative to the first anchor frame and a second offset relative to the second anchor frame;
   parsing the closed captioning data associated with the video stream to locate the first anchor frame corresponding with the presentation of the first displayable text string located in the closed captioning data;
   identifying a beginning boundary of the at least one interstitial of the show based on the located first anchor frame and the first offset;
   parsing the closed captioning data associated with the video stream to locate the second anchor frame corresponding with the presentation of the second displayable text string located in the closed captioning data;
   identifying an ending boundary of the at least one interstitial of the show based on the located second anchor frame and the second offset;
   identifying the location of the at least one interstitial based on the identified beginning and ending boundaries;
   outputting the video stream for presentation to a user; and
   outputting a progress bar during output of the video stream that indicates the location of the at least one interstitial within the recording and a duration of the at least one interstitial.

7. The method of claim 6, further comprising:
   outputting the location of the at least one interstitial using a first indicator; and
   outputting a location of the at least one segment using a second indicator.

8. The method of claim 6, wherein each of the first and second anchor frames is associated with a presentation location of the last two bytes of the respective displayable text string in the video stream.

9. The method of claim 6, wherein parsing the closed captioning data associated with the video stream further comprises:
   indexing the closed captioning data according to a presentation order to generate indexed closed captioning data;
   discarding null closed captioning bytes from the indexed closed captioning data; and
   parsing the indexed closed captioning data to identify the first and second anchor frames.

10. The method of claim 6, wherein each of the first and second displayable text strings is unique within the text data.

11. The method of claim 6, further comprising:
    filtering the at least one interstitial from the video stream based on the identified beginning and ending boundaries to generate a filtered video stream; and
    outputting the filtered video stream to a user.

12. A digital video recorder comprising:
    a receiver that receives a video stream including at least one segment of a show, at least one interstitial of the show, and closed captioning data associated with the video stream, and receives metadata referencing the closed captioning data to identify first and second anchor frames within the video stream, the metadata comprising first and second displayable text strings included within the closed captioning data as originally transmitted by a content provider, the metadata further comprising a first offset relative to the first anchor frame, and a second offset relative to the second anchor frame;

a recording module that stores the video stream on a storage medium for subsequent presentation to a user;

a parsing module that parses the closed captioning data associated with the video stream to locate the first anchor frame corresponding with the presentation of the first displayable text string located in the closed captioning data recorded, identifies a beginning boundary of a segment of the show based on the first anchor frame and the first offset, parses the closed captioning data associated with the video stream to locate the second anchor frame corresponding with the presentation of the second displayable text string located in the closed captioning data recorded, identifies an ending boundary of the segment of the show based on the second anchor frame and the second offset, and identifies a location of the interstitial based on the beginning and ending boundaries; and a presentation module that outputs the video stream for presentation to a user and outputs a progress bar during output of the video stream that indicates the location of the at least one interstitial within the recording and a duration of the at least one interstitial, according to the beginning and ending boundaries.

13. The digital video recorder of claim 12, wherein the presentation module is further operable to:
   filter the at least one interstitial from the video stream based on the identified beginning and ending boundaries to generate a filtered video stream; and
   output the filtered video stream to a user.

14. The digital video recorder of claim 12, wherein the presentation module is further operable to:
   output the location of the at least one interstitial using a first indicator; and
   output a location of the at least one segment using a second indicator.

15. The digital video recorder of claim 12, wherein each of the first and second anchor frames is associated with a presentation location of the last two bytes of the respective displayable text string in the video stream.

16. The digital video recorder of claim 12, wherein the parsing module is further operable to:
   index the closed captioning data according to a presentation order to generate indexed closed captioning data;
   discard null closed captioning bytes from the indexed closed captioning data; and
   parse the indexed closed captioning data to identify the first and second anchor frames.

17. The digital video recorder of claim 12, wherein each of the first and second displayable text strings is unique within the text data.

* * * * *